United States Patent
Cox, Jr. et al.

(10) Patent No.: US 7,267,275 B2
(45) Date of Patent: Sep. 11, 2007

(54) SYSTEM AND METHOD FOR RFID SYSTEM INTEGRATION

(75) Inventors: George E. Cox, Jr., Richmond, VA (US); Daniel T. George, Richmond, VA (US)

(73) Assignee: Captech Ventures, Inc., Richmond, VA (US)

( * ) Notice: Subject to any disclaimer, the term of this patent is extended or adjusted under 35 U.S.C. 154(b) by 330 days.

(21) Appl. No.: 10/981,168

(22) Filed: Nov. 4, 2004

(65) Prior Publication Data

US 2005/0092825 A1    May 5, 2005

Related U.S. Application Data

(60) Provisional application No. 60/613,732, filed on Sep. 27, 2004, provisional application No. 60/559,713, filed on Apr. 6, 2004, provisional application No. 60/517,018, filed on Nov. 4, 2003.

(51) Int. Cl.
    *G06K 7/08* (2006.01)
(52) U.S. Cl. ............ 235/451; 235/492; 340/571.2
(58) Field of Classification Search ........... 235/451, 235/492; 340/572.1
    See application file for complete search history.

(56) References Cited

U.S. PATENT DOCUMENTS

| | | | | |
|---|---|---|---|---|
| 5,995,046 | A * | 11/1999 | Belcher et al. | 342/450 |
| 6,593,885 | B2 * | 7/2003 | Wisherd et al. | 342/463 |
| 6,681,990 | B2 | 1/2004 | Vogler et al. | |
| 6,717,517 | B2 | 4/2004 | Przygoda, Jr. | |
| 6,724,308 | B2 | 4/2004 | Nicholson | |
| 6,804,578 | B1 | 10/2004 | Ghaffari | |
| 7,187,287 | B2 * | 3/2007 | Ryal | 340/572.1 |
| 2002/0007325 | A1 | 1/2002 | Tomon | |
| 2002/0070862 | A1 | 6/2002 | Francis et al. | |
| 2002/0111819 | A1 | 8/2002 | Li et al. | |
| 2003/0132853 | A1 | 7/2003 | Ebert | |
| 2003/0132854 | A1 | 7/2003 | Swan et al. | |
| 2003/0173403 | A1 | 9/2003 | Vogler | |
| 2003/0209601 | A1 | 11/2003 | Chung | |
| 2003/0216969 | A1 | 11/2003 | Bauer et al. | |
| 2003/0222762 | A1 | 12/2003 | Beigl et al. | |
| 2003/0227392 | A1 | 12/2003 | Ebert et al. | |
| 2004/0015418 | A1 | 1/2004 | Dooley et al. | |
| 2004/0036623 | A1 | 2/2004 | Chung | |
| 2004/0155778 | A1 | 8/2004 | Shek et al. | |
| 2004/0164864 | A1 | 8/2004 | Chung et al. | |
| 2006/0214772 | A1 * | 9/2006 | Hsieh et al. | 340/10.2 |

OTHER PUBLICATIONS

Kevin T. Higgins, "Brave New RFID World", Oct. 10, 2004, magazine issue date: Jan. 1, 2004.

Escort Memory Systems, "Radio Frequency Identification (RFID) & Network Interface Modules", Publication #17-7088, Rev. Jan. 2001.

"ObjectStore Introduces the First Comprehensive Product for Real-Time RFID Application Development", Oct. 18, 2004, copyright 2004 IBC Ltd.

(Continued)

*Primary Examiner*—Steven S. Paik
(74) *Attorney, Agent, or Firm*—Williams Mullen, P.C.; Thomas F. Bergert

(57) ABSTRACT

A robust system, method and environment for the programming, collection, manipulation, and propagation of RFID data enhances the integration of RFID elements into new and existing enterprise systems.

18 Claims, 11 Drawing Sheets

OTHER PUBLICATIONS

Alka Gupta and Mayank Srivastava, "RFID Readme", Oct. 24, 2004.
"RFID Reshapes Supply Chain Management", Oct. 20, 2004.
David Margulius, "The Rush to RFID", Jun. 17, 2004.
"SAMSys Technologies Provides RFID readers And Integration Support For Microsoft Business Solutions", Jan. 27, 2004.
"SAP and Infineon Introduce Scalable Solution to Ease Integration of RFID Hardware and Software", Oct. 6, 2004.
"TAGSYS Teams Up with Phillips to Develop ePC Smart Label System", Nov. 28, 2002.
"Transforming the Supply Chain with RFID", Copyright 2004 Yantra Corporation.

* cited by examiner

SYSTEM AND METHOD FOR RFID SYSTEM INTEGRATION

CROSS-REFERENCE TO RELATED APPLICATIONS

The present invention claims priority under 35 U.S.C. 119(c) of U.S. provisional patent application Ser. No. 60/517,018, titled "System and Method for Improved Management of Data in RFID Systems" and filed Nov. 4, 2003, U.S. provisional patent application Ser. No. 60/559,713, titled "Improved Data Management in RFID Systems" and filed Apr. 6, 2004, and U.S. provisional patent application Ser. No. 60/613,732, titled "System and Method for Determining RFID Tag Direction, Movement and Speed" filed Sep. 27, 2004, all of which are incorporated herein by reference.

FIELD OF THE INVENTION

The present invention relates to a system and method for improved acquisition and management of data in RFID (Radio Frequency Identification) systems, and more specifically for obtaining, aggregating, classifying and disseminating valuable data gathered from RFID systems.

BACKGROUND OF THE INVENTION

RFID systems are gaining in popularity for use in retail, commercial and health care service industries for applications such as point-of-sale data management, rental item tracking, baggage handling, real-time location systems and inventory management, or more broadly, supply chain management. An RFID system generally consists of transponders or tags containing a chip, wherein the chip holds data that can be read by an RF transceiver or reader when the transponder passes within range of the reader. The reader is provided with an antenna and processing logic for reading the data from the tag.

In typical embodiments, an RFID antenna emits radio signals to activate an RFID tag and read and write data to and from the tag. Antennas act as data conduits, part of a coupling for data communications, between tags and RFID readers. Antennas are available in a variety of shapes and sizes. Antennas in some embodiments are built into doorways to receive tag data from objects passing through doors or mounted on interstate tollbooths to monitor traffic passing by on a freeway. In some embodiments, where multiple tags are expected continually, the electromagnetic field produced by an antenna is constantly present. If constant interrogation is not required, the field can be activated by sensors.

An antenna is typically packaged with an RFID reader, which is, configured in various embodiments as a handheld or as a fixed-mount device. An RFID reader in typical embodiments emits radio waves in ranges of anywhere from one inch to 100 feet or more, depending upon its power output and the radio frequency used. When an RFID tag passes through the electromagnetic field of a radio signal from an RFID antenna, the RFID tag detects the reader's activation signal. The reader decodes the data encoded in the tag's integrated circuit and the data is passed to an appropriate component such as a system server for processing.

RFID transponders or tags come in a wide variety of shapes and sizes, and can be incorporated as part of contactless smart cards, smart labels, plastic or glass housings, key fobs, watches and the like. Readers can be hand-held, mobile devices or can be maintained in a fixed position.

RFID tags are categorized as either active or passive. Active RFID tags are powered by an internal battery and are typically read/write, i.e., tag data can be rewritten and/or modified. An active tag's memory size varies according to application requirements; some systems operate with up to 1 MB of memory. In a typical read/write RFID work-in-process system, a tag might give a machine a set of instructions, and the machine would then report its performance to the tag. This encoded data would then become part of the tagged part's history. The battery-supplied power of an active tag generally gives it a longer read range. The trade off is greater size, greater cost, and a limited operational life (which may yield a maximum of 10 years, depending upon operating temperatures and battery type, for example).

Passive RFID tags operate without a separate external power source and obtain operating power generated from the RFID reader. Passive tags are consequently much lighter than active tags, less expensive, and offer a very long operational lifetime. The trade off is that passive RFID tags have shorter read ranges than active tags and require a higher-powered reader. Some passive tags are programmed with a unique set of data (usually 32 to 128 bits) that cannot be modified. Read-only tags most often operate as a license plate or index into a database, for example, in the same way as linear barcodes reference a database containing modifiable product-specific information.

SUMMARY OF THE PRESENT INVENTION

In one aspect, the present invention contains a set of tools, libraries and APIs (application programming interfaces) to speed the integration of RFID equipment into existing enterprise systems regardless of equipment type or manufacturer, or enterprise system application or operating environment. Adoption of RFID technology has been historically slowed by the abundance of incompatible standards and interfaces between the tags and readers, and readers and host computers. Other systems for collecting and integrating data received from RFID readers are lacking, as are systems for managing and interfacing the data with data-driven applications.

One approach of other systems can be explained in terms of providing computer program products for communicating item disposition information in a distributed system. The typical system may include a monitoring system, one or more subscribers, including a system that tracks tagged items, and one or more event routers. The monitoring system is operable to detect one or more of the tagged items, generate an event (where the event includes a tag identifier, a reader identifier, and a timestamp), and publish the event to one or more of the event routers. The system for tracking tagged items is operable to subscribe to receive from one or more of the event routers events relating to one or more of the tagged items, and upon receiving events, use the received events to update disposition information for one or more of the tagged items. Each event router is operable to maintain a list of subscribers, receive events from the monitoring system, and send events to the subscribers.

A tagged item is a tangible item that carries or is bound to a self-identifying tag. The tag might be associated with a single item or it might be associated with a collection of items, by being bound to a container containing the items, for example. The tag can be passive (containing no internal power source for communications and data transmission) or active; and it can have processing capacity or not. A tag is a digitally identifiable tag, meaning that the tag has the property that a unique digital identifier (UID) can be read directly from the tag using some kind of tag reader. Some digitally identifiable tags can also be written to.

One UID system is the EPC (electronic product code) system developed by the MIT Auto-ID Center. An EPC is a number that can be used to identify a physical item. As currently defined, an EPC has 96-bits, partitioned into an 8-bit header and three data fields: manufacturer, product class, and serial number. The manufacturer field uniquely distinguishes one manufacturer from another. For a given manufacturer, the product class field uniquely distinguishes one product class from another. The serial number field uniquely distinguishes one particular item from another item of the same product class and manufacturer. In this way, the EPC is inherently hierarchical in nature, and certain portions of the EPC number can be masked to control the level of specificity of the EPC number. For example, if an application only wants to know about the tracking information at the manufacturer level (e.g., which locations contain products manufactured by Nike™?), then the product class and serial number bits can be masked. UIDs other than EPCs are also used.

Such other systems do not adequately integrate RFID systems into existing enterprise systems. For example, other systems are often reliant on specific standards, and may be geared toward specific application programs, operating environments or RFID devices. Other systems further suffer from not adequately managing and/or pre-processing data received from RFID readers so that accurate, integrated and appropriate information is delivered and/or used by the end program.

BRIEF DESCRIPTION OF THE DRAWINGS

FIGS. 5 through 7 are example interfaces for use with the management and monitoring component of the present invention.

DETAILED DESCRIPTION OF THE PREFERRED EMBODIMENTS

In this specification, the terms "field," "data element," "attribute," and "code" are generally used as synonyms, referring to individual elements of digital data. Aggregates of data elements are referred to as "records" or "data structures." Definitions of complex data structures that include member methods, functions, or software routines in addition to data elements are referred to as "classes." Instances of complex data structures are referred to as "objects" or "class objects."

The present invention, in part, provides a set of tools to integrate a heterogeneous set of readers and hosts. For example, the present invention can manage tag types from 13.56 mhz Texas Instruments TagIT™ tags, to industry standard EPC (electronic product code) Class 1 tags seamlessly without changes in integration software or interfaces. The present invention further provides utilities to handle problems inherent in other methodologies for managing data in the RFID world, such as detecting a tag leaving the view of a reader and/or tracking the direction of movement of a tagged item. In one aspect, the present invention abstracts the concept of a reader and encapsulates it into the concept of a field. A field may include only one antenna from a reader, or may include several readers together. This abstraction relieves the end application from having to understand the exact configuration of readers deployed in a given environment. For example, a field may encompass three readers required to cover a particularly large doorway. Further, the system of the present invention accommodates multiple readers of different manufacturers, different frequencies, different error handling, or different host interfaces. Similarly, the present invention can accommodate tags having different manufacturers, different communication protocols, different memory structures, different frequency, and/or different power supply type (e.g., active or passive). The present invention further provides robust data management for RFID tag events. Events can be easily filtered, duplicated, and routed so that multiple enterprise applications can receive RFID information without requiring integration between the enterprise applications. In one embodiment, the present invention can be configured via an XML file allowing complex system configurations to be configured and integrated without writing a single line of programming code.

Figure 1:
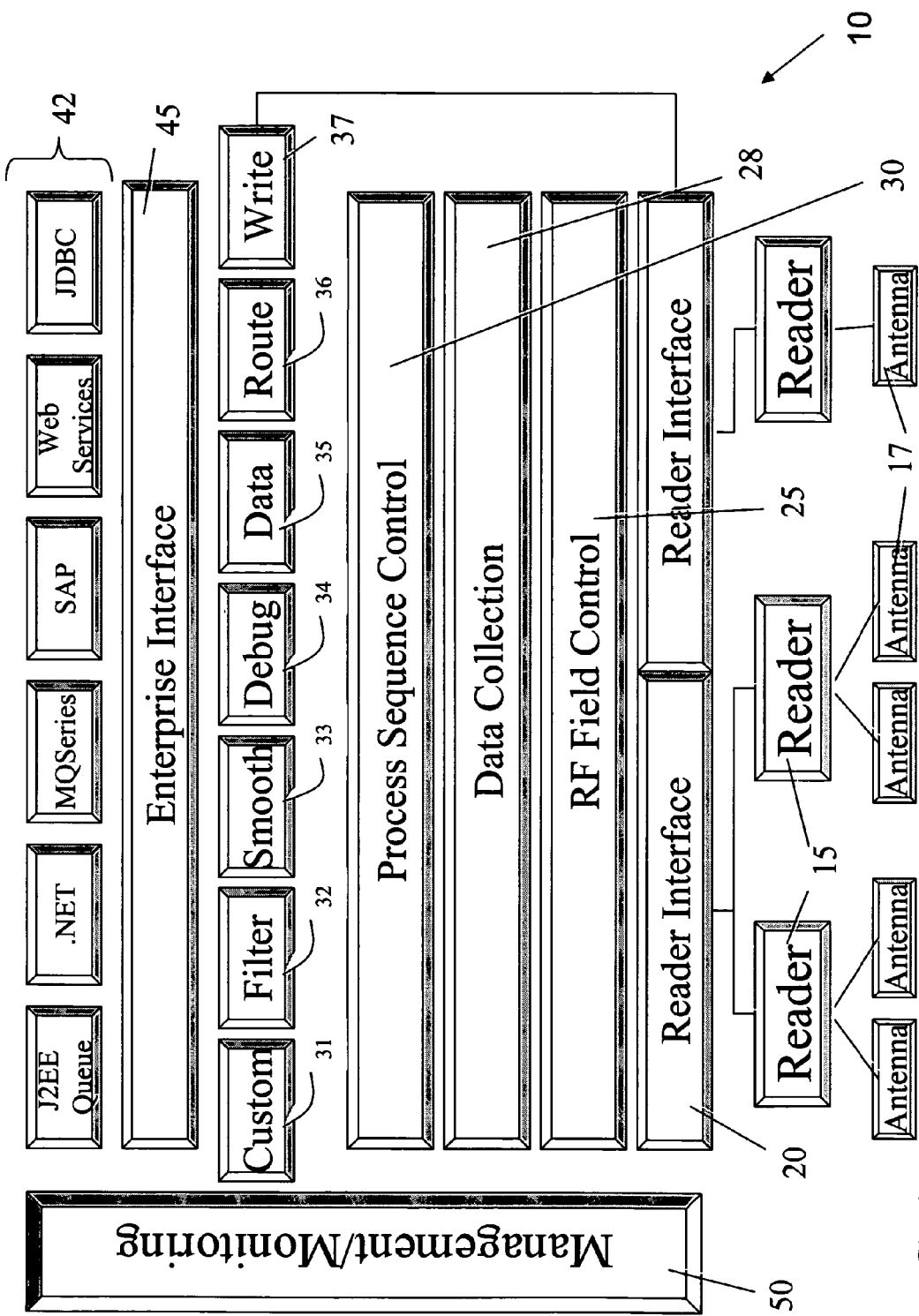
FIG. 1 is a schematic view of one embodiment of the system of the present invention.

As shown in FIG. 1, the system 10 of the present invention can include a plurality of device/reader interfaces 20 having program code, which can be embodied in software, hardware or a combination of hardware and software and which allows other system components to interact with devices 15. Devices 15 are shown with antennae 17 for identifying the presence of tags. In one embodiment, interfaces 20 comprise a device-specific set of instructions and a device-neutral set of instructions. Upon implementation, the interface can be configured to interact with the devices specified. For example, the present invention can be installed for operation regardless of the RFID reader to be used, and upon determining which reader is being used, the present invention can be configured to interact with the reader through interface 20. By way of example, the present invention can interface with RFID readers commercially available through Alien Technology™, ThingMagic™, SamSys™, Texas Instruments™, FEIG™ or Sensormatic™.

Enterprise interfaces 45 can similarly be provided with system-specific and system-neutral sets of instructions for a diverse range of applications. For example, the present invention can include specific instructions for interfacing with a number of higher-level applications including supply chain management (SCM) software. For example, SCM software provided by SAP AG of Walldorf, Germany, enables a user to manage materials, information, and finances as they move in a process from a supplier to a manufacturer to a wholesaler to a retailer. The SCM software generally implements algorithms for determining the best means to fill an order and also includes databases for tracking the physical status of the goods, the management of materials, and financial information. Inventory management, as a component of most SCM systems, enables suppliers to keep track of how much inventory they have and how much inventory they have distributed to particular retailers. Periodically, the retailer reports to the supplier the current inventory level of the store. Based on the report, the supplier determines whether the store inventory needs to be replenished. Other systems to which the present invention can interface can include systems such as J2EE Queue, MQSeries, Web services, Net, JDBC, etc. as identified generally at 42.

The RF Field Control element 25 enables the present invention to abstract the concept of a reader and encapsulate it logically into the concept of a field. A field may include only one antenna from a reader, or may include several readers together. This abstraction relieves the end application from having to understand the exact configuration of readers deployed in a given environment. For example, a field may encompass three readers required to cover a particularly large doorway. The field control can be configured by accessing a configuration file and establishing which readers will be associated or identified as a field, for example.

Data collection component 28 incorporates data collection functionality as is known in the art, and interacts with Process Sequence Control element 30 for integrating, manipulating and otherwise managing the collected data for application use. The Process Sequence Control element 30 helps define the "chain" of data processing, and can implement the example processing components indicated, namely custom processing 31, filtering 32, smoothing 33, debugging 34, data 35, routing 36 and writing (if possible) 37. Such elements and other processing components or links are described more completely hereinafter.

Figure 5:
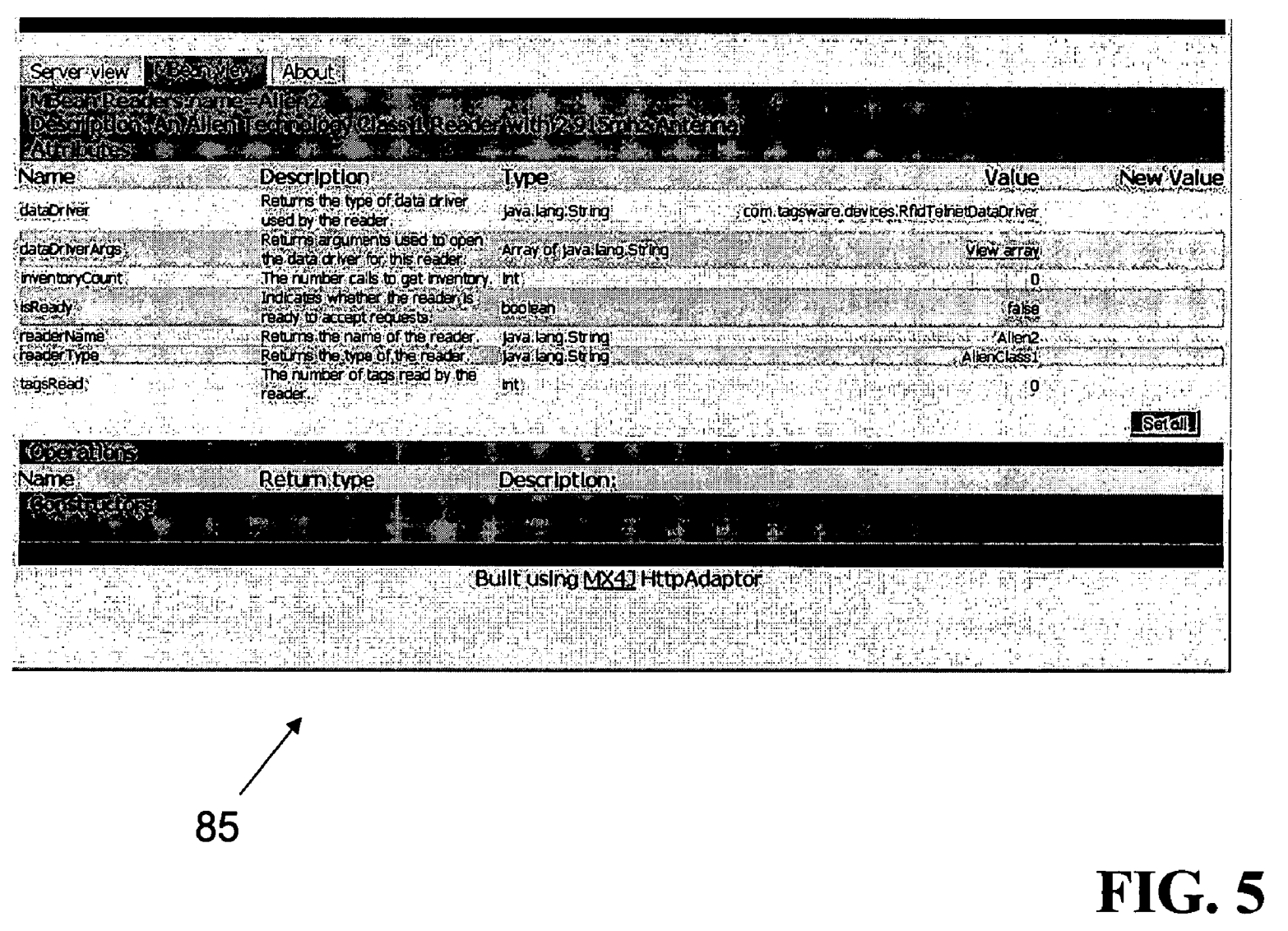
Figure 6:
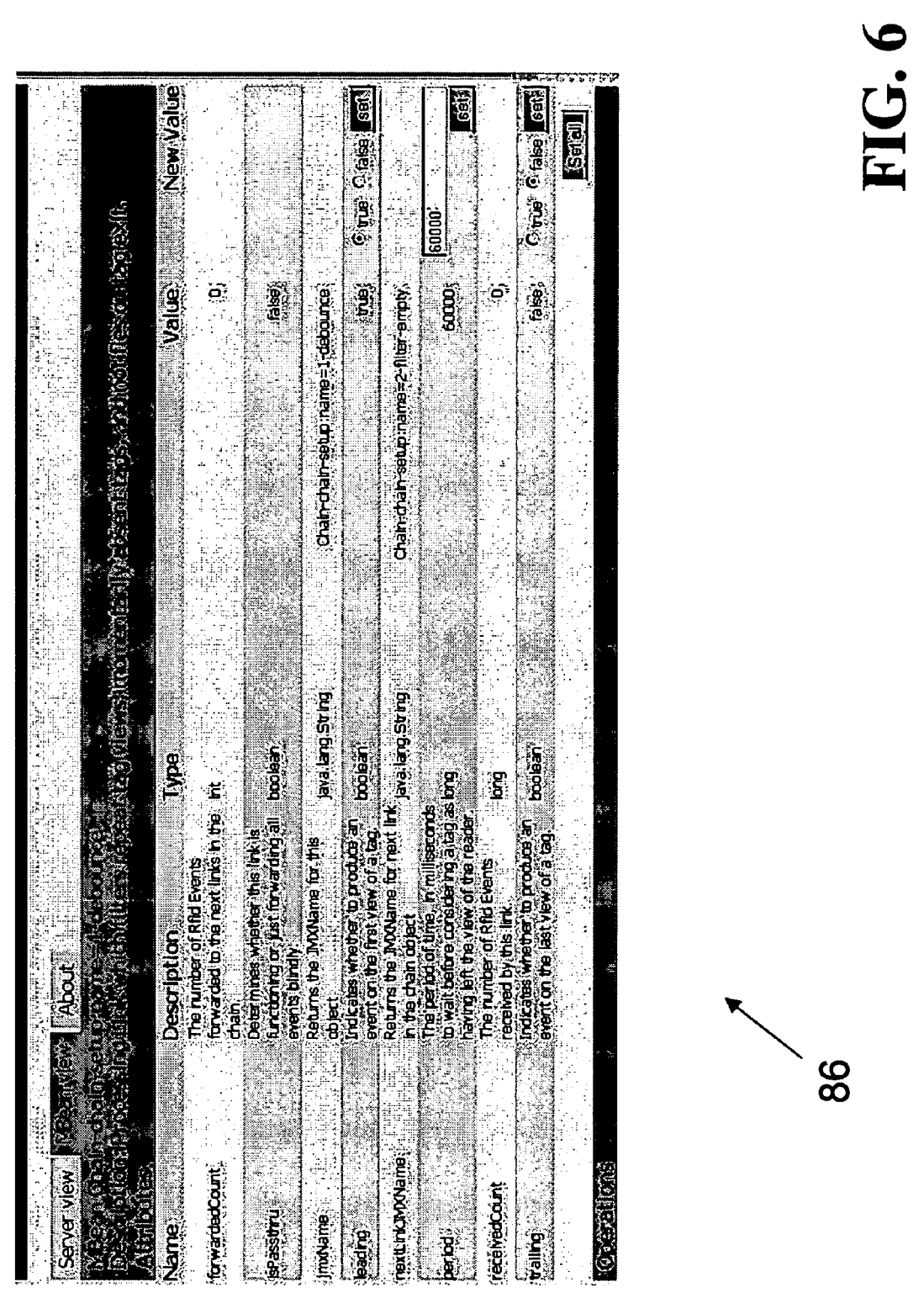
Figure 7:
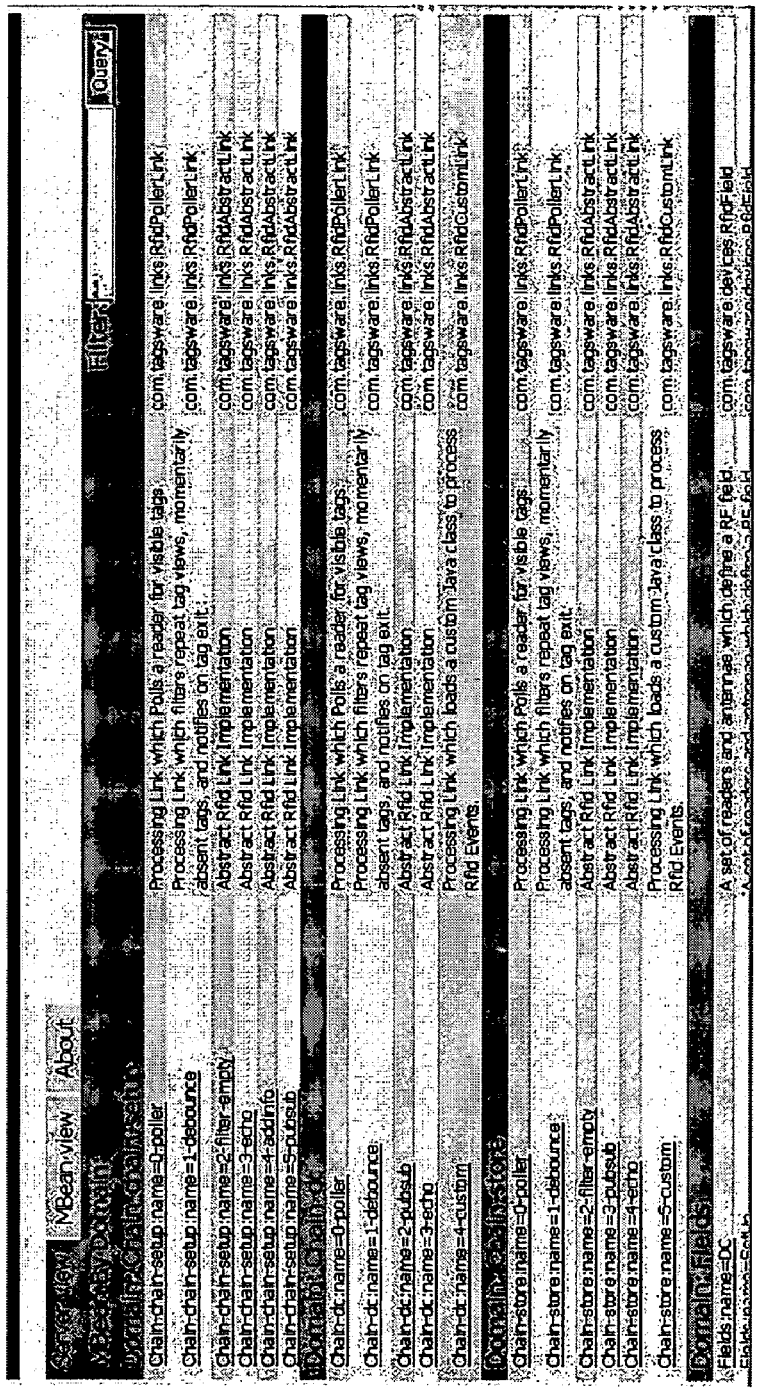

Management/monitoring component 50 enables users to configure the present system for specific processing. For example, the frequency with which an RFID device will poll for tags can be set, the setup of readers for polling can be established, and the identification of tags for "inactive" or "asleep" status can be established. Configurations can be pre-established prior to system operation or, in some cases, can be set during run-time. FIGS. 5 through 7 show some example screen shots (85, 86 and 87, respectively) of a management interface in accordance with the present invention. In one embodiment, the management/monitoring component 50 is a JMX management console.

The present invention can be used with legacy enterprise systems and in mixed equipment environments. The present invention can be used for device driver/control system diagnostics, alerts and notifications, as well as for remote/on-line maintenance, upgrades and extensions. With regard to data monitoring and management, the present invention provides improved data aggregation and integration, real-time event monitoring, multi-protocol format negotiation and automated decision-making support tools. The present invention also facilitates further application development tools, including object-naming support and device/application/system performance monitoring tools.

Figure 2:
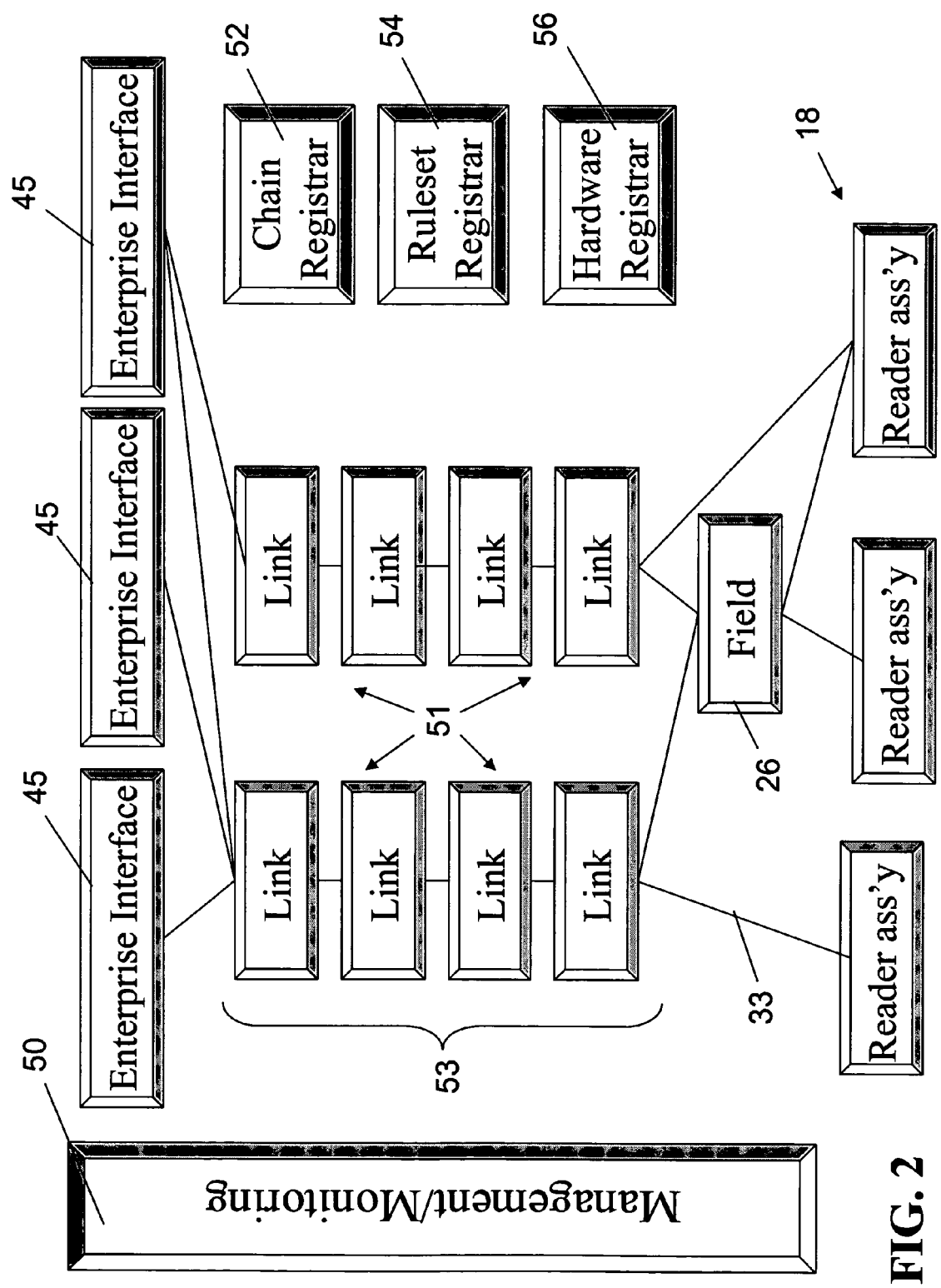
FIG. 2 is a schematic view of one embodiment of the system of the present invention employing a pipe and filter architecture.

In one embodiment, the architecture in connection with the present invention can be provided with three major components: 1—links that convey RFID data from readers through to applications; 2—drivers that provide a standard interface to RFID equipment; and 3—application infrastructure elements that support the use of links and drivers in an application. According to the present invention, RFID data is transformed from raw, noisy data into abstract information ready for introduction into an enterprise system. In one embodiment, in order to achieve this, the present invention incorporates a chaining design, where links 51 register for updates and pass this information along, as shown in FIG. 2. As each link processes the data from RFID reader assemblies 18 (including the readers and corresponding antenna and interface), the data becomes better suited for introduction into enterprise systems. In doing so, the present invention minimizes the number of modifications to the enterprise systems while introducing RFID capabilities into the environment.

Chaining objects that pass along information in increasingly abstract form facilitates integration of the present invention into existing enterprise systems. In the architecture of the present invention as shown in FIG. 2, the invention abstracts the view of an RFID reader and RFID tag into a field 26 such that a processing link 51 does not need to be aware of the type of reader, or in many cases the type of tag being processed. Because of this architectural feature, a user of the present invention may intermingle reader brands and tag types to best suite their business requirements. The linking architecture fits within a larger architecture that provides infrastructure support for applications. The registrars associated with the present invention are application "blackboards" with specific purposes; they are places where independent elements of an application can post and read information. For example, an application can ask the chain registrar 52 for information about existing communication chains. An application can ask the ruleset registrar 54 about reader, event, tag and routing rules. An application can also ask the reader registrar 56 about reader hardware and software.

In one embodiment, the use of Java™ allows the present invention to operate on a large variety of platforms including Windows, HPUX, AIX, Solaris, Linux, and any other platform that supports recent versions of Java. The RFID architecture of the present invention defines a way to link RFID information flows so that raw data is consolidated into high-level application information. This sub-architecture fits within an overall architecture for making RFID information flow manageable within a complex system.

In one embodiment of the invention as shown in FIG. 2, the program flow of the present invention follows a pipe-and-filter architecture which implements chains and links. A chain 53 is a series of processing steps to be performed on an event. A chain consists of one or more links 51. Each link performs a discrete operation on the event being processed by the chain.

An event object represents a reader detecting a group of tags. The introduction of an event (e.g., represented at 33 in FIG. 2) starts the processing sequence. A link performs its specified processing on an event and then the event is forwarded to the next link in the chain. Some links may produce additional events which are sent through the chain from that point forward. Some links may eliminate events and not forward them down the chain. In one embodiment, a Java™ class within the Java™ Virtual Machine running the present invention can introduce events into a chain. Common methods of introducing events into a chain include having a poll link at the beginning of a chain to poll a field or reader or having an active reader send events to a chain.

The following table lists the possible chain links and briefly describes their function.

TABLE 1

Link Summary

| Link Name | Comment |
| --- | --- |
| Addinfo | Adds properties to the event, tags within the event or system properties to the event. These properties will then be available to links further down the chain. |
| async | Causes the chain to execute the remainder of the chain asynchronously from the links prior to this link. Control flow will immediately return to the source of the event while the event continues to be processed by downstream links. |
| atomize | Takes an event with multiple tags and produces a series of events, each with one (1) tag. |
| build | Builds a large number, such as an EPC number, from component numbers based upon a ruleset. |
| close | Close an external unstructured resource and optionally forward the contents of the resource to another external unstructured resource. |
| custom | Calls a custom written Java ™ object when an event occurs. The object can access and modify the event that triggered the invocation. |
| debounce | Performs data smoothing on the tag reads to eliminate jitter caused by marginal radio signals from the tags. The debounce link will filter events except for first sightings or last sightings of tags. |
| echo | The echo link produces a message for the log file. This is typically used as a debugging tool. |
| expression | The expression link allows the chain to perform some mathematical expression and to save the result in a property of the event, tag or system. |
| Filter-empty | The filter-empty link discards events that have no RFID tags associated With the event. The empty event is not forwarded down the chain. |
| Fork | This link executes a side chain from the main line of the chain. |
| Forward | The forward link sends the event to another chain configured in the system. The forward will wait for the flow of control to return before sending the link to the next link in its own chain. |
| J2EE-p2p | Sends the event or event data to a J2EE point-to-point queue. |
| J2EE-pubsub | Sends the event or event data to a J2EE publish and subscribe queue. |
| Lock | Locks a resource to forestall access by other links until the resource is unlocked. |
| log-detail | Produces a detailed audit log record of the event. |
| MQ-p2p | Writes a record to an MQSeries ™ queue. |
| parse | Parses a large number, like an EPC number, and generates its components numbers as tag properties. The format of the number is based upon a defined number system. |
| poll | This link polls a reader or field for visible tags. The frequency of the poll is determined by the frequency at which events arrive at the link. This link is typically the first link in a chain that is being fired by a timer-job. |
| print | Print a string to an unstructured external resource. |
| println | Print a string to an unstructured external resource followed by a end-of-line sequence (either line-feed or carriage-return followed by line-feed) |
| program-tag | Allows a chain to program a serial number onto an EPC compliant tag. The value of the number to program is determined by properties in the event triggering the link. |
| Purifier | Filters tags until the number of reads of the tag reach a defined threshold over a defined period of time. |
| query-io | Queries an IO pin on a reader to determine the state of that pin. |
| router | Sends the triggering event to other chains based upon values within the event. The routing rules are based upon configuration defined rulesets. |
| set-direction | Determines the direction of tag movement based upon multiple reads of the tag by multiple antenna. |
| set-io | Sets the value of an IO pin on a reader to control some external device. |
| shutdown | Stops the instance, terminates all threads and exits the program with a specified exit code. |
| sim-recorder | Records a stream of tag data into a file that can be replayed by the simulated reader program. |
| SQL | Calls a JDBC database and interacts with that database. The SQL link can record data to the database or retrieve information from the database and associate it with the triggering event. |
| table-get | Retrieves one column from a lookup table. |
| table-lookup | Uses a lookup table as a cross reference against properties in the event being processed. The matching properties in the table are associated with the event or tag that triggers the lookup. |
| table-put source resource. | Stores the existing values in a lookup table back to the tables This will create a new row in the table if a matching table row does not exist. |
| table-reload | Causes the lookup table to be reloaded from is source resource. |
| table-remove | Matches the properties of an event against a lookup table and removes any rows in the table that match the source event. |
| table-save | Saves the contents of a lookup table back to its source resource. |

TABLE 1-continued

Link Summary

| Link Name | Comment |
|---|---|
| tag-map | Maps a portion of the tags NVRAM to a property within the present invention. Once the NVRAM is mapped it can be handled like any other property within the system. |
| tag-read | Reads the tags NVRAM from the tag and places it into the tag object within the present invention. Once placed in memory, the values in NVRAM can be mapped to properties. |
| tag-write | Writes the in-memory copy of the tags NVRAM back to the physical tag. |
| transfer | Transfer the contents of one external unstructured resource to another external unstructures resource. |
| ucc-parse | Parses a numeric value into its UCC defined sub-components, if the number is a UCC formatted number. The resulting sub-components are placed into properties of the tag. |
| unlock | Unlocks a locked resource. |
| web-service | Call a SOAP or .NET compliant web service. The link can both send and receive data from the web service. The information to send to the web service comes from properties of the event, and the data received from the service can be stored in the event. This link does not require in-depth knowledge of the operation of web services. This link generates the required structures and interprets the webservice information dynamically. |

Figure 3:
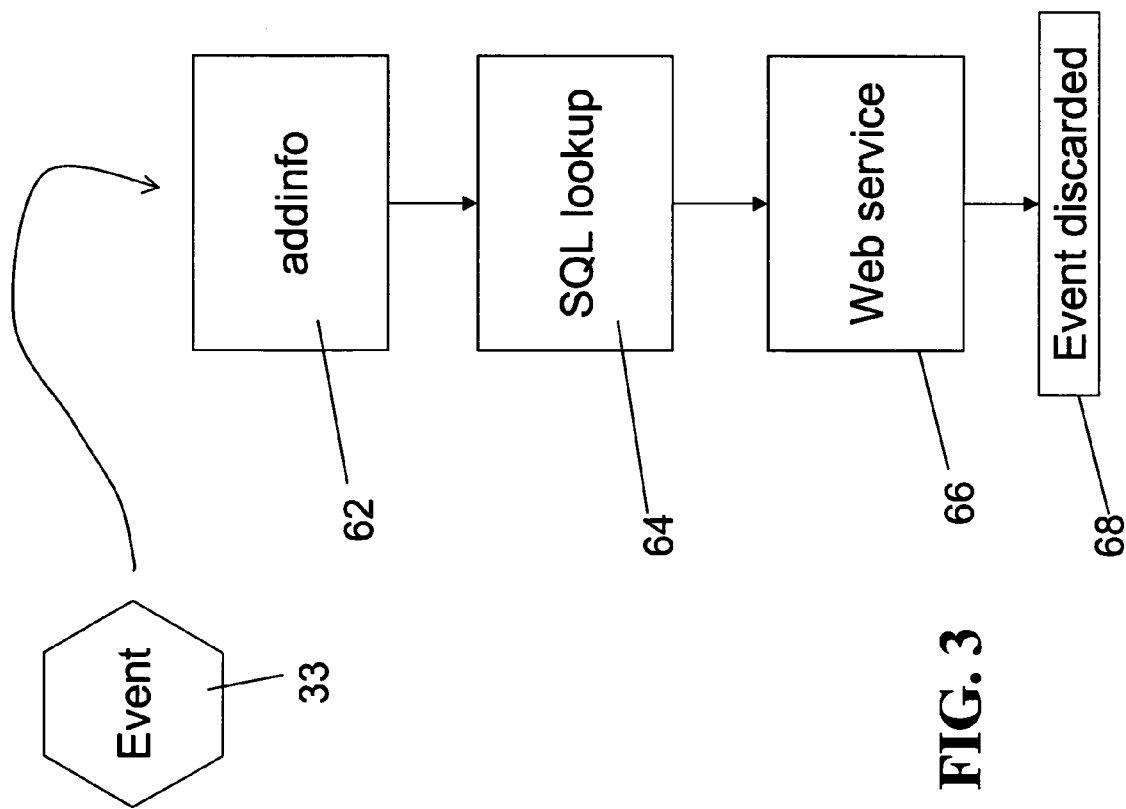
FIG. 3 is a flow chart illustrating a sample event processing chain.

The flow of an event through a very simple chain can occur as shown in FIG. 3. In step 1, the event 33 is introduced into the chain. The first link it encounters is an addinfo link 62. The addinfo link 62 will add some piece of information to the event. After step 1, the event now has some information added. The addinfo link passes the event to the next link in the chain, an SQL link 64. In this example, the SQL link 64 retrieves some information from a database and adds that information to the event. In step 3, the SQL link 64 passes the event to a web-service link 66. In this example, the web service link 66 passes some data from the event to the web service. The end of the chain is reached and the event is discarded once the web service is complete, as at 68. When the event is discarded, tag and event properties associated with the event are also discarded. The present invention also ensures that the memory consumed by the event is reused by future events.

Figure 4:
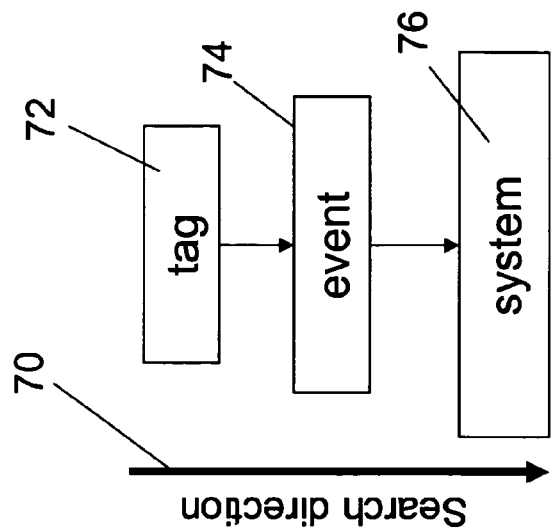
FIG. 4 is a flow chart illustrating a sample search direction for a link using a property of unspecified scope, in accordance with one embodiment of the present invention.

The present invention enables each event and tag in the system to hold additional information called properties. Proprieties are either intrinsic to the event or added to the event through a processing link. Properties may then be used within links to specify variable information for that link. Each property in the system belongs within a specific scope. In one embodiment, there are three scopes of properties in the present invention: tag, event and system. Properties that are in the tag scope are associated with a tag within an event. Properties that are in the event scope are associated with an event in the system. Properties that are in the system scope are system wide and can be accessed by any link in the system at any time. If a link attempts to use a property and does not specify a scope, the tag scope 70 can be searched first, followed by the event scope 72, and finally the system scope 74, for example, as shown by the direction arrow 70 in FIG. 4.

In one embodiment, properties may be embedded within most configuration values used in the system. In one example in connection with the present invention, the syntax for embedding a property is to surround the property name with a '${' at the beginning and a '}' at the end of the name. When a property name in the '${<name>}' is replaced with the value of the property, that is called property substitution. For example, the string '$ {product_type}' placed into an attribute will be substituted with the value of the property named 'product_type'. The time that the substitution of embedded properties occurs will vary depending upon the link in question. For example, some link attributes will have embedded properties substituted at the time the configuration file is first loaded into the system, while other link attributes will have embedded properties substituted at runtime when an event is handled. The time of substitution can be documented, for example, in an XML configuration reference guide with the information for each link and attribute. Property names used within the system may include properties nested within them, which effectively provides for arrays or lists of properties.

Each tag and event employed in the present invention can be provided with a set of built-in properties. In one embodiment of the invention, built-in properties are read-only properties, which are set by the system of the present invention when the event is created and are not to be altered. The substitution of properties in link parameters (also called attributes or elements) can occur as either a string substitution or an object substitution, for example. In one embodiment of the invention, if a link parameter has multiple embedded properties or constant text along with an embedded property, the property is always embedded as a string. In another embodiment, if the property appears alone in the link parameter, then the property will be substituted by an object with the value of the property.

An event can have zero or more tags associated with it. If a reader is polled through a poll link or via auto-mode and returns a list of visible tags, those tags will be associated with the event produced by the read. Individual tags and events can have auxiliary data associated with them. The auxiliary data for tags is stored as properties in the tag scope. When a link processes an event which has multiple tags, the link will perform its processing on each tag in the event.

The present invention makes efficient use of external resources by providing a means to define resources global to a configuration and to pool those resources at runtime. This pooling of resources improves the performance of the present invention and reduces the computing resource burden on the external system. In one embodiment, the present invention requires the definition of JDBC connections and web-service servers as resources. When a SQL link, web-service link, external RMI server, or external XML server is defined, it must reference a resource previously defined. The present invention also defines a class of external resources called external unstructured resources. These resources comprise file or socket based resources that have no standard defined structure. A configuration in connection with the present invention can write data to these unstructured resources and other programs or systems can read these resources. A resource may be considered unstructured in such cases where no standards body has defined a data format for them, for example. In such cases, the data format must be defined at the time the present invention is integrated with the external system. The present invention can also send data in unstructured format to operating system files, email recipients, FTP servers and TCP sockets, for example.

As the present invention operates, it spins new threads to perform the processing. Threads are light weight processing streams that allow a single program to perform multiple tasks concurrently. Threads improve the responsiveness of the system but have the capability, if unmanaged, to overload a system. The thread pool feature of the present invention provides a means of managing and/or controlling thread usage and making thread creation more efficient. In one embodiment of the present invention, thread pools are defined in the resource section of the configuration. A thread pool can be defined with a 'thread-pool' element. The valid and required attributes for a thread pool definition are, in an illustrative embodiment, the name, minimum poolsize and maximum poolsize.

The present invention allows timers to be defined, wherein the timers periodically fire events into processing chains. Using this feature, one can configure a chain to be fired, thereby polling a reader for visible tags. This feature is useful in the event that the given reader does not support auto-mode.

The present invention may have zero or more readers defined. Each reader defined represents one hardware reader deployed in the environment. In one embodiment, a unique name must be given to each reader in the system, which enables the present invention to distinguish between the various readers within the system. A single reader may have multiple hardware interfaces that transfer data using different wiring and protocols (such as serial and Ethernet interfaces, for example). The data transfer method can be defined for each reader in configuration files. The present invention provides multiple methods of retrieving tag information from readers and fields. The first method is by periodically polling the reader to request tag sightings. This mode is called interactive or polled mode. The poll link provides this functionality. Each poll may produce one or more events. Each event represents the sightings from one antenna. If tags are detected on multiple antennas, for example, the number of events produced will match the number of antennas that detected tags. The timing of the poll is typically determined by a timer resource injecting an event into the chain with the poll link.

The second method of retrieving tag information from readers and fields (e.g., bonded readers) is by setting the readers into autonomous mode. Many readers support autonomous operation. In this mode, the reader actively searches for visible tags. When tags are detected the reader notifies the reader object in the present invention. The reader object then produces one or more events containing the tag ids and forwards those events to any listening chains. The interval at which the reader reports tag sightings is configurable.

The present invention provides a useful abstraction of a group of readers called a field. A field can be thought of as an area covered by one or more antennae that appears to the system as one reader. For example, if a facility has a large doorway that is too large for one reader to cover completely, one may use multiple readers and/or multiple antennae to cover that space. It will be appreciated that a single reader may comprise multiple antennae. Multiple antenna or multiple readers can be aggregated or bonded into a single logical reader or reader field sharing a common logical position. In one embodiment, the common logical position is geospatial, as in the doorway example above. In another embodiment, the common logical position can be related to business logic, where readers or antennae are grouped into a single logical reader for data management pertaining to inventory management or customer relationship management, for example. To coordinate all of the tag sightings coming from all the readers covering that space or logical position, and to eliminate duplicate sightings, requires significant processing after the fact. In one embodiment, duplicate sightings are controlled by merging a duplicate sighting into the previous sighting as long as the time frame in which the duplicate sighting occurs is within a predefined limit (e.g., if tag sightings from multiple readers in a field occur in a short time frame, it may be likely that the extra tag sightings are duplicates). When defined as a field, this group of readers appears as one logical reader to the system. All duplicate sightings are automatically scrubbed by the field logic. Therefore, if a tag is seen by two readers in the field, it is only reported as one read to the rest of the system. Fields support both polling and autonomous mode operation with the restriction that all readers in a field must support autonomous mode for the field to support autonomous mode operation. In one embodiment of the invention, fields are different from readers in that a chain in connection with the present invention cannot program an id into a tag using a field as the programming reader. In one embodiment of the invention, fields are configured via an XML file, wherein each field has a name unique among all readers and fields defined. In one embodiment, fields have attributes including a name, auto-mode identifier, auto-chain identifier, auto-interval identifier, and field reader elements have a name and antenna identifier. The auto-mode identifier indicates whether the field should enter auto mode upon system startup. The auto-chain identifier specifies the name of the chain to which automatically detected tags should be sent. The auto-interval identifier specifies the number of milliseconds to wait between sending automatically detected tags to its listeners (e.g., chains). Attributes can have default values, and in the embodiment just described, the name and auto-chain attributes can be of a string type, the auto-mode attribute can be a true-false type, and the auto-interval attribute can be an integer type.

Events within the present invention represent some event occurring within the system. Events include tags entering view, tags departing view, timers firing, and reader health notifications, for example. Custom event types may be produced by code that has extended the present invention. An event may include zero or more tags that are associated with that event.

TABLE 2

System Defined Event Types

| Event Type | Meaning |
| --- | --- |
| tag_present | A tag or tags has been sighted by a reader or field. The event contains the tags that are visible. |
| tag_departed | A tag or tags have left the view of a reader or field. The debounce link produces this type of event. The event contains the tags that have departed. |
| timer_event | A timer-job has fired and produced the event. The event will have a property of 'timer-job' that gives the name of the timer job that produced the event. |
| antenna_sick | A health check on an antenna has determined that an antenna is no longer operational. The event contains the reader name, antenna that are having trouble and the check tags that are no longer visible. |
| antenna_well | A health check on an antenna has determined that an antenna has returned from a sick state and is now operating correctly. The event contains the reader name, antenna that have been restored and the check tags that are now visible. |
| reader_move | The reader has detected that it has moved due the the detection of a new location tag. |

A tag object in the present invention represents RFID tags in the physical world. In addition to holding auxiliary properties, tags are differentiated by the type of tag they represent in the physical world. For example, a 64 bit EPC class 1 tag has different characteristics than an ISO-14443 tag. The following table lists the tag types within the present invention and documents the differences between them.

TABLE 3

Tag Type Table

| Tag Type | Real World Type | Id Size (bytes) | NVRAM Size (bytes) |
| --- | --- | --- | --- |
| EPC0 | Matrics EPC0 Read only tag | 8 | 0 |
| EPC1-64 | 64 bit EPC class 1 tag | 8 | 0 |
| EPC-1-96 | 96 bit EPC class 1 tag | 12 | 0 |
| ISO15963 | ISO-15963 13.56 mHz tag | 8 | 256 |
| ISO14443_MIFAREUltralight | Philips MIFARE Ultralight ™ | 4 | 54 |
| ISO14443_MIFARE4K | Philips MIFARE Plus ™ | 4 | 4096 |
| IS)14443_MIFAREClassic | Philips MIFARE Standard ™ | 4 | 1024 |

In one embodiment of the present invention, the invention is operated as a standalone Java™ program communicating with the hardware devices and with the back-end systems. When run as a standalone program, the present invention provides a web browser based management interface 50 from which an operator can view and control operational parameters of the the present invention configuration. In this mode, the behavior of the present invention can be determined exclusively by an XML formatted configuration file. A second mode of operation for the present invention is to embed it within an existing Java™ based environment, such as a warehouse management system or J2EE container. In this mode of operation, the behavior of the present invention can be determined by a combination of XML configuration files or configuration driven by Java™ objects exposed to the surrounding system. In this mode of operation the management interface may or may not be enabled, depending upon configuration.

When operating in standalone mode, there are various configuration options for the present invention. In one embodiment, the present invention configuration file is structured using XML syntax. Resource configuration in the present invention facilitates the configuration of external systems to which the configured system instance connects and the configuration of internal resources such as thread pools and timers. In one embodiment of the present invention, there are four types of external resources that may be configured in the resource section, SQL, web-service, RMI, and XML. Each resource defined in the system can be uniquely named so that other links in the system may refer to it during processing. An SQL resource specifies a connection to a JDBC compliant database external to the present invention. A web-service resource specifies an external web-service to which the present invention may send information. An RMI resource specifies a remote instance of the present invention to which this instance of the present invention may forward events. An XML resource specifies an external instance of the present invention to which this instance may forward events in XML format.

The chain configuration in the present invention determines the processing steps performed on RFID data is it is conveyed from the readers to the enterprise application. The number of chains defined by the present invention is unlimited with the possible exception of memory constraints. Each chain can be provided with a unique name comprising a combination of letters, numbers and underscores ("_"), for example. A chain can forward events to other chains, and can call external systems via external connector links provided in accordance with the present invention.

Examples of various links and their functionalities provided in accordance with the present invention are described herein. In one embodiment, common attribute links common to all links are provided, such as a "onerror" link, which specifies how a link should behave in the event of an error.

Of other links provided in accordance with the present invention, the addinfo link adds or modifies the properties of an event or tag. The properties that are modified may be in the system, event, or tag scope. If there are multiple tags in the event, this function is invoked for each tag in the event. If there are no tags in the event, this function is invoked once. The async link alters the flow of event processing allowing the links subsequent to the async link to continue processing the event while the async link returns control to the original caller of the chain.

The atomize link converts any event with more than one tag to a series of individual events each with one tag. If the event entering the atomize link has zero or one tag then the event is forwarded unchanged. The atomize link has no attributes except for the standard onerror attribute. The build link builds a large number based on the rules in a number system and properties within the current tag. The build is executed on each tag in the event, or once if the event has no tags.

The close link closes an external unstructured resource and optionally transfers the contents of the resource to another resource. The custom link connects a custom written Java™ object to a chain, allowing the customer to extend the functionality within the present invention. When the link is encountered, the custom class is called and the event is passed to the object. The custom Java object is responsible for performing some operation and then returning. The custom link wrapper will forward the event to the next link in the chain. The custom link may also define a set of arguments to pass to the custom link when the link is initialized.

The debounce link smooths tag visibility jitter coming from polled or autonomous reads of tags from RFID readers. The debounce link will filter tags within events and only relay the events that have first or last sightings of a tag. The determination of whether a sighting of a tag is the first sighting or last sighting is determined by whether that tag has been seen within a time period. If a tag has not been seen within the predefined period and it is detected then that sighting is considered a first sighting, or leading sighting. If a tag goes unsighted for the time period then the last sighting of it is considered the last sighting, or trailing sighting. If the tag reappears after not being sighted for the time period it is considered a first sighting. If a debounce link is configured to producing trailing events then any reader or poll link feeding the chain should be configured to generate empty events.

The echo link produces an output message to the log file for debugging or tracing purposes. The message is produced with a log level of INFO. The message text may also be specified in the text between the <echo> and </echo> tags. If the message attribute is specified it overrides any intraelement text specified for the link.

The expression link performs some mathematical expression and saves the results into a property value. The property value may be in the tag scope, event scope, or system scope as determined by the property name. Various expression operators as are commonly known are available using the system of the present invention, including add, subtract, multiply, divide, and so forth. Similarly, various functions are available within an expression, such as, for example, absolute value, character value, integer value, and so forth.

The filter-empty link causes the chain to drop any events that have no tags associated with them. If this link receives an event with zero tags, the event is discarded and control returns to the start of the chain. This link type is typically used after a debounce link on a chain that has a poll or reader that is generating empty events. Filtering the empty events will prevent meaningless events from reaching the back-end systems. Filter-empty will also remove timer events that have no tags associated with the event. This link has no attributes other than attributes common to all links.

The fork link splits the chain into a diverged sub-chain. The fork link can be used to easily send the event processing to an ancillary chain. The fork link acts as a simple in-line forward statement. The fork link has no attributes other than those common to all links. The forward link will divert an event from the current chain (the calling chain) to another chain (the called chain), either on this system or on a distributed instance. Once the called chain has completed processing of the event, the forwarding chain continues operation on the event. If the called chain altered properties in the event, the calling chain will see the new properties.

The J2EE-p2p link sends event and tag data to a J2EE JMS point-to-point queue. The J2EE-pubsub link sends event and tag data to a J2EE JMS publish-and-subscribe queue. Log-detail instructs the audit logging system of the present invention to log a detailed record of the state of the event and values of the tags at this point in the processing of the event. This link goes a step beyond the normal audit logging in that this link has the ability to log individual tag values and properties. The parse link applies the rules of a number system in accordance with the present invention to a large value and parses out the smaller numbers embedded within the larger number.

The poll link polls a reader or field to ascertain whether the reader has sighted any tags. A poll link typically appears at the head of a chain and produces events that are propagated down the rest of the chain. The print and println links send text to an external unstructured resource. The println differs from the print link in that it appends a newline or carriage-return/newline to the end of the output. The type of end-of-line appended depends upon the type of system on that the present invention is running.

The program-tag link instructs a reader to program an id value into a tag. In many instances, there are restrictions and limitations on programming tags due to the underlying RFID technology. Only one tag may be in view of the programming antenna. The tag must be the proper distance from the antenna. The proper distance is determined by the tag technology, the antenna and the surrounding environment. All of these issues make tag programming a complex task. An example of tag programming occurs such as follows: the configuration polls a reader for tags; when the reader sees a tag, and only one tag, it retrieves the next tag number from a database and then programs that number into the visible tag.

The purifier link filters tag reads until a specified threshold of reads have occurred on a tag. The query-io link allows a chain to examine the status of an external IO pin on a particular reader. External IO pins are provided by some reader manufacturers to provide an interface to the outside world. If the queried pin is on then the returned property is 1 (one), if the pin is not on the returned value is 0 (zero). The router link examines the contents of an event and routes the event to a chain or chains based on those values. The router link uses rulesets as the basis for making the routing determination. The use of common rulesets allows multiple chains to use the same consistent rules in routing events.

The set-direction link applies the direction logic of a map in accordance with the present invention to the tags in a link to determine the direction of movement of the tags. The set-io link allows a chain to turn on or off an external IO (input/output) pin on a reader. IO pins are provided by some reader manufacturers to allow the reader to control other hardware in the facility. A value of zero will turn the pin off, any positive non-zero value will turn the pin on. The shutdown link terminates the running instance immediately. It also returns an exit code to the shell that started the program. The sim-recorder link allows a chain to record the flow of tags through the chain to a file that can be read into the simulated reader and replayed. This functionality allows a developer to replay a realworld scenario through the simulated reader. The file that is produced by the sim-recorder link must be edited slightly before being replayed by the simulated reader.

The SQL link enables the instance to communicate with a JDBC compliant database. The table-get link maps a single column of a lookup table to a property in the tag or event. The table-lookup link maps all the columns of a table to properties within a tag or event. The table-put link adds a row to a lookup table. The table-reload link triggers the reloading of all table data from the resources defined external source. The table-remove link deletes a row from a lookup table. The table-save link saves the contents of the table back to the source of the data, either a database, web service or flatfile.

The tag-map link maps a chunk of tag memory from a tag containing NVRAM to a property within the present invention. The tag-read link reads the contents of the NVRAM in a tag into the systems memory and associates those values with the tag in triggering event. The tag-write link writes the systems copy of the tag's NVRAM to the physical tag. The transfer link sends the contents of an external unstructured resource to another external unstructured resource. The ucc-parse link interprets and parses a number as a EPC or UPC value according to the EPC Tag Data Standards version 1.1. The component values are added to the tag as properties that are accessible to other links and external resources. In one embodiment, the ucc-parse link has no attributes. The value to parse may be specified in the intra-element text. If no value is specified the tag id of the tags triggering the link will be parsed. The web-service link enables the the present invention instance to communicate with a system providing a web-service interface, such as .NET, J2EE, and others.

Rulesets, such as may be held in ruleset registrar 54 of FIG. 2, enable the router links to evaluate and route events to the appropriate chains. A single ruleset may be used by multiple router links within the system. This simplifies the reuse of rules in multiple places. A ruleset can be provided with a name that is unique within that instance. A single ruleset may include one or more rules. Each rule includes a test and actions. The comparison test in the rule may be comprised of several comparisons against values in the tag combined with logical ANDs, ORs, and NOT operators. When the rule performs the tests against an event with multiple tags in the event, the test will return true if any tag in the event evaluates to true via the tests defined for the rule. A rule's actions can consist of forwards and breaks. A forward will send the event to another chain. A break action tells the router to stop evaluating rules and send the event to the next link.

Server configuration in the present invention allows the present invention instance to receive events from other instances. When an event is received from another instance, a local chain can continue processing the event and returns the modified event back to the calling instance. When an instance is a server, other programs, in addition to instances, can send events to it. This enables tight integration with third party or proprietary systems.

The present invention configuration file allows the implementor to activate or deactivate a JMX management feature of the present invention. JMX management allows programs and users outside of the present invention to view and potentially modify operational attributes of the present invention. FIGS. 5 through 7 show example user interfaces using JMX management.

As with other system components, readers are defined in the present invention configuration file as an element. Once it's defined, the reader element can then be used as an attribute for other links (see <poll>, <program-tag>, <set-io>, <query-io>, <field>). Each reader defined in the configuration file represents one physical reader. Most readers can be set up to run in two different modes: autonomous and interactive (a.k.a polled). In autonomous mode (a.k.a. auto mode), the present invention can configure the physical reader to continuously query its antennas for tags. Once an RFID tag enters or leaves the reader's field, the reader will send the tag information via a listener to the present invention, which in turn will create an event for each tag and forward it to a defined chain. This mode prevents the present invention (and its underlying hardware) from having to drive the query tag process, thereby saving processing resources on the host. In interactive mode, a reader is first defined in the configuration file and then is utilized by an event-introducing link such as a poll link. In this case, the reader acts as the server and will wait for a query command from the present invention to be issued. Once received, the reader will then query its field for tags and return the list of tags to the present invention. A physical reader can also be used to write information to a tag in its field.

Each physical reader contains one or more antennae which are used for detecting and programming RFID tags. Currently, when a reader is configured to run in autonomous mode, the physical reader will query tags using all associated antennae. When a reader is running in interactive mode however, specific antennae can be used to perform tag reads and writes. The list of antennas can be configured by setting the antenna attribute in links carrying out reader-oriented processes (see poll, program-tag, set-io, query-io, field). In order to allow a reader to run in autonomous mode using a specific list of antennas, the reader must first be defined in the configuration file. A field tag would then need to be configured, with the field-reader sub-element's name attribute set to the defined reader. The field-reader's antenna attribute would then be set to the list of querying antennas.

In one embodiment of the present invention, reader element attributes include: name, driver-class, type-class, auto-mode, auto-chain, auto-interval, auto-generate-empty, map and move-chain. The name, auto-mode, auto-chain, and auto-interval attributes are similar to those attributes as defined above. The driver-class attribute can be a string type which gives the full class name of the Java™ class that is the low level communications driver for this reader. The type-class attribute can be a string type that gives the class name of the protocol handler for the reader. The auto-generate-empty attribute can be of true-false type, and specifies whether the reader should generate empty events when operating in autonomous mode. The map attribute can be of string type and can specify the name of the map resource containing reader location information against which the configured reader will compare its reads to determine location. The move-chain attribute can be of string type and can specify the name of the chain to which the reader object will send events when the reader changes locations.

Reader health checking is a means provided by the present invention to detect users and applications in the event that a reader or antenna goes offline. In a passive data collection system, it is important to know when the passive portions of the system are malfunctioning. The present invention accomplishes this by checking for the existence of specific tags within the reader's field of vision, wherein the tags being checked for are in positions that the reader will regularly detect. When the reader no longer detects these tags, the system deduces that the reader must be malfunctioning. The present invention determines that an antenna is malfunctioning, or sick, by having a number of reads that do not detect a check-tag. A good value for this number, called the sick threshold, will vary according to the environment around the reader, reader type, tag type and other application specific values. It should be set high enough to not alert on normal visibility issues with the tags. If an antenna is malfunctioning, the present invention attempts to determine when the antenna resumes operation. It makes this determination by continuing to look for the check-tag. If it detects the tag for some predetermined number of reads, it then considers the antenna to be functioning. When the present invention determines that an antenna is not reading correctly, it can produce two types of notifications. First, it can produce a JMX notification to any interactive JMX management listeners. If no applications are listening for JMX notifications from the present invention, then this type of notification will be lost. Second, it can produce a tag event which it sends to a chain for processing. This event has an event type of 'antenna_sick', the reader generating the event and the tag and tag type that triggered the event. If a malfunctioning antenna resumes proper operation, the present invention will also produce two notifications—one to any JMX notification listeners, and the other to a processing chain. The event sent to the processing chain has an event type of 'antenna_well', the generating reader, the tag and tag type that triggered the wellness notification.

The present invention allows any type of reader antenna to be monitored for correct operation by the definition of tags that should be seen by the reader frequenty. The tags, called check-tags, can be defined for any reader defined in the system. Within the reader element's intraelement text a '<health>' section can be defined. Within the health section multiple '<checktag>' elements can be defined.

The present invention supports a wide variety of readers and includes appropriate configuration information for each, including readers such as the Alien Technology™ 9RE-001 (2 antenna, 915 MHz), Alien Technology™ ALR-9780 (4 antenna, 915 MHz), ThingMagic™ Agile Mercury3™ (4 antennae, 2-915 MHz, 2-13.56 MHz), the simulated reader of the present invention having 1 or multiple antennae, Philips Pegoda USB Reader, TI S6350, TI TIRIS S251B, Matrics RDR-001, and SAMSys 9320 EPC. It will be appreciated that the different readers can have different numbers of antennae, different frequency transmissions, different modes (such as automode, or no automode, for example), different tag types associated therewith, and different TCP, serial and NVRAM support. Each can be configured and defined accordingly in connection with the present invention.

The present invention can be configured to determine the direction of tag movement, and how to dynamically determine reader location. The present invention provides a means by which readers and/or antennae may detect their location and associate that location data with events produced by the reader and/or antenna. In one embodiment of the present invention, the directionality and locality functionality comprises three primary objects: Environment Map, Reader object, and the set-direction link. The environment map defines all of the possible tag movement directions, and the location tags. The reader object examines the tag detected by the reader and determines the location of the reader based on those tags. The set-direction link examines the tags moving through the link, calculates the direction of movement, and assigns that direction to properties within the tags. The environment map is defined in the resource section of the present invention configuration. A configuration may have zero or more maps. A map contains a list of direction vectors that define the possible directions of which a tag may move. A map also contains a list of possible reader locations and the location tags that define those locations.

Figure 8:
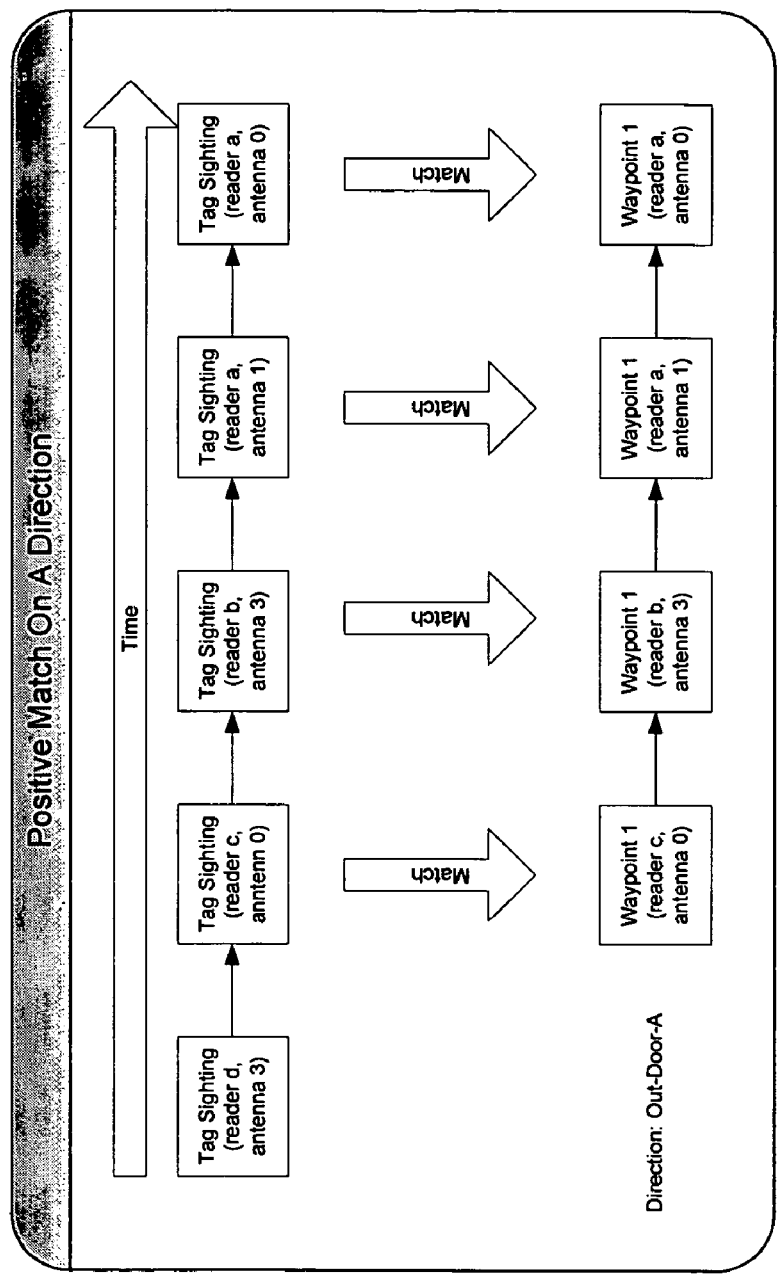
FIGS. 8 and 9 are flow diagrams illustrating the method of determining tag direction in accordance with one embodiment of the present invention.
Figure 9:
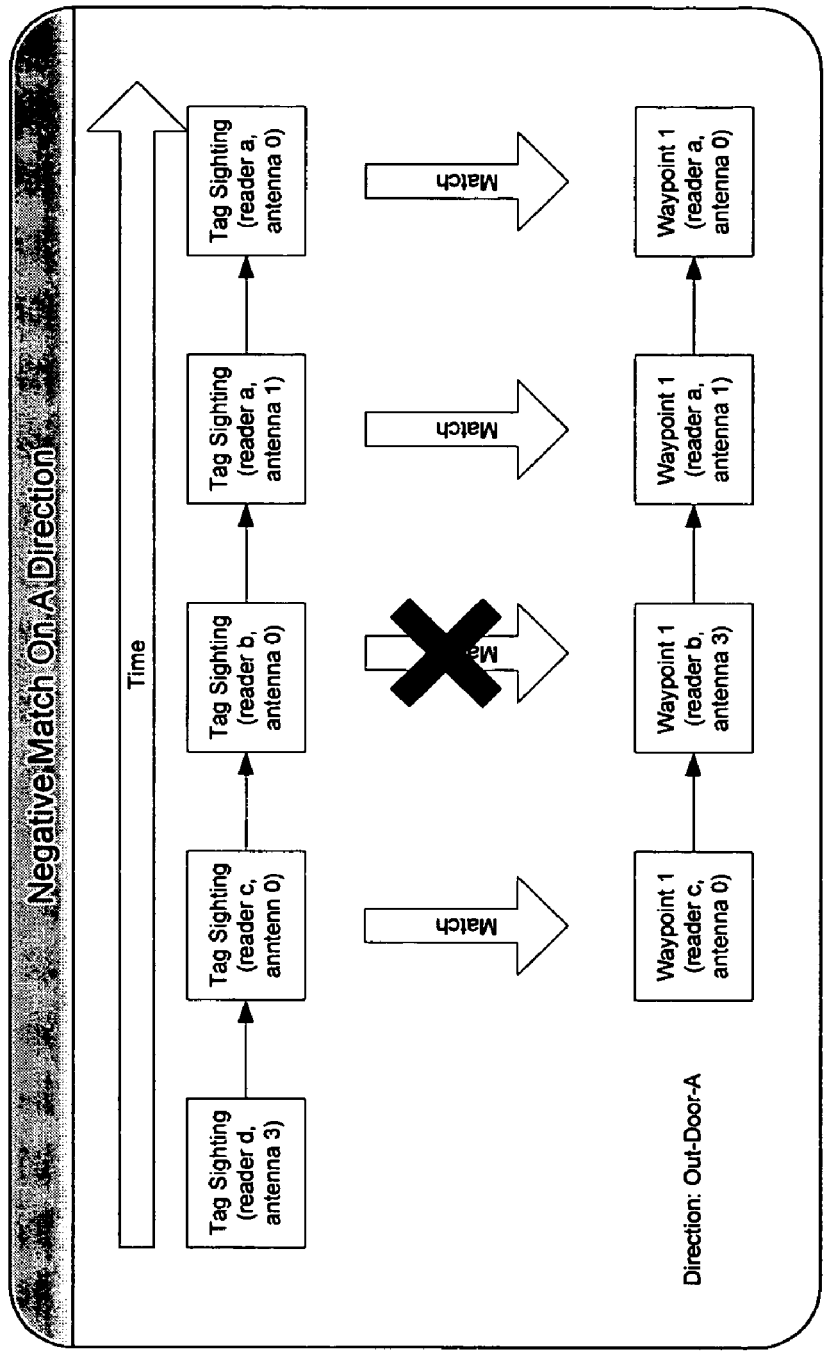

By discovering direction of RFID tag movement within a multiple reader environment, the present invention adds another benefit for implementations such as supply chain RFID systems and asset management systems (e.g., hospitals, etc.). In doing so, the system can be used to first configure a series of readers and/or antennae using the standard configuration mechanisms of the invention. Next, a map can be configured in the resource section, and a direction can be defined in the map giving it a name and maximum traversal time. The maximum traversal time indicates how quickly a tag must cross all of the listed waypoints to be considered as having moved in that direction. Any number of directions can be defined within a map. A direction can comprise a direction name, a direction maximum traversal time and at least 2 waypoints. Each waypoint can comprise a reader name and antenna number that comprise the waypoint. The system is then operated by starting the readers and passing the tags through the read fields. In one embodiment, once any two antennae detect and read a given tag, the system can determine based on the time of the tag reads, whether the tag is proceeding in a defined tag direction. The system analyzes the sighting history of the tag and compares that against the list of directions. If a matching direction is found, that direction name can be stored and/or added to each tag object in the system as a property. To determine a direction, the system keeps a history of tag movements. As a tag is sighted, its past movements are compared in reverse order against the waypoint vector for each direction. FIGS. 8 and 9 are example diagrams showing a positive match 90 on a direction (FIG. 8) and a negative match 92 (FIG. 9).

A direction is defined as a set of points in a vector. The system monitors the sightings of each tag, if a tag's sightings match those of a defined direction then that direction is assigned to the tag. A point in the direction vector is defined by a reader name and antenna number. The direction vector lists each point in the order that they must be traversed for the system to identify the movement as the specified direction. Consider the diagrams in FIGS. 8 and 9. The direction 'Out-Door-A' is defined as sightings in the following order: reader 'c' antenna 0, reader 'b' antenna 3, reader 'a' antenna 1, and reader a antenna 0. If a tag is detected by those four antennas in that order then the direction is determined to by 'Out-Door-A'. A tag that has the sightings in FIG. 8 is considered as moving in that direction: The first sighting is inconsequential since it was made before the being seen at reader 'c' antenna 0. The next four sightings match the order of the 'Out-Door-A' direction.

The example tag sightings in FIG. 9 do not match the direction 'Out-Door-A' because the third sighting is not the correct reader/antenna combination. In addition to factoring into the calculation the sequence of tag sightings, the present invention also considers the amount of time required to traverse the waypoints in the vector. A maximum traverse time can be defined with each direction. If all of the waypoints in the direction vector are not traversed in that amount of time then the tag is not considered to have traveled in that direction. For example, if the traverse time on the 'Out-Door-A' direction is set to 30 seconds, but the tag takes 45 seconds from the first sighting at reader 'c' to the last sighting at reader 'a' then that movement will not match the specified direction.

Within a map resource definition, one may define locations within the map. A location is composed of one or more location tags that are present at that location. When defining a reader, one may specify a map name to use for determining its location. As a reader detects tags with its antennas it compares those detected tags against the locations within its map. If some or all of the tags read match those defined for a location then the reader's last known location is set to that location name. The location tags are eliminated from the tags propagated to the processing chains. If tags from multiple locations are detected in a read, the location that has the most reads (the highest sum of read counts from all location tags within each location) is determined to be the location. The last known location is added as a property to each tag generated by the reader. Optionally, the reader may generate an event to an alternate chain if the location of the reader changes. If the movements of a tag match two direction vectors then the first direction vector defined in the map is the direction assigned to the tag.

Direction maps are a resource defined in the resource section of the present invention configuration file. A configuration may contain any number of map definitions. Reader location information is defined within a map resource. A map may have any number of location definitions. Each location definition may have any number of tags defined to identify that location. To utilize a direction map within the processing of an event, one can use the 'set-direction' link to analyze tag history and determine tag directions.

Reader location is determined by the reader object when it scans for tags. By default, readers do not attempt to determine their location. Specifying the 'map' attribute on a reader definition causes the reader to examine tags detected to determine the location. If the 'move-chain' attribute is specified then an event will be sent to that chain to indicate that the reader location has changed.

In one embodiment, multiple tag readers are configured for receiving and reporting tag signals and tag information, and an environment map representing the environment where the tag readers are deployed is also configured. Next, at least one tag direction is defined to include a direction name and direction maximum traversal time. When one of the tag readers picks up or receives a tag signal indicating a tagged item bearing a given tag is passing the reader, it writes information to the tag indicative of the tag having passed the reader. The reader also reads tag information from the passing tag and determines whether the given tag has information matching a defined tag direction. If it does, the reader writes information to the tag indicative of the tag having traveled in the defined direction.

Timers provide the ability for the present invention to schedule when chains are to be executed. Timers can be instructed to run when a specified length of time has passed or at specific times based on a rules engine. A timer job specifies a piece of work that should be done on a periodic basis. Every timer job is composed of one ore more triggers. Time-span and CRON timers are examples of timers supported by the present invention. Time-span timers fire every X milliseconds where X is any positive integer. The minimum number of milliseconds definable is zero, but most systems do not support Java™ timers with enough accuracy for events every millisecond. Most Java™ implementations will result in a 2-4 millisecond granularity of the timer. Therefore, if a timer is defined as 1 millisecond, it may produce a time-span of between 0 and 5 milliseconds. CRON triggers are based on UNIX job scheduler that has gained acceptance from its users and provides an elegant expression language for specifying the execution times of a task. CRON triggers fire at specified points in time, for example, every day at 10:00 am. The present invention allows the user to use CRON expressions directly or break up the expression into its individual pieces for each unit of time (second, minute, hour, day of week, day of month, month and year). In one embodiment of the present invention's configuration, timer jobs are defined to point to a chain. The job can be triggered by one or more time span or CRON triggers. When the trigger fires, the job produces an event with an event type of 'timer_event'. The events produced have no tags associated with them. When a timer trigger fires a processing thread creates the timer event and sends it to a chain. If the processing of the chain exceeds the time before the firing of the next trigger, then a timer overlap occurs. The handling of timer overlap varies according to the type of trigger. If the trigger overlapped is a time-span trigger, then the time-span trigger will fire immediately upon the processing of the first trigger completing. For example, if a timespan trigger is configured to fire every minute and fires at 10:00 am, but the chain takes 120 seconds to complete then the next firing of the trigger will be at 10:02 am. If the trigger overlapped is a CRON trigger then it will not fire until the next valid trigger time. For example, if a CRON job is configured to fire every 3 minutes and the trigger first fires at 10:00 am and the processing of the chain takes 4 minutes completing at 10:04 am. The trigger will not fire again until 10:06 am.

In one embodiment, the present invention can interface with a SQL database using JDBC as the connection technology. JDBC (Java™ Database Connectivity) is a standard Java™ API that consists of a set of classes and interfaces that Java application developers use to access a database and execute SQL statements. JDBC connects to a database via a database driver designed for the target database technology. JDBC supports almost all databases on the market, including Microsoft SQL Server, Oracle, Progress, Sybase, MySQL, DB2, Domino, IBM AS/400, and many others. Most database vendors provide JDBC drivers at no cost. The present invention maintains all JDBC connections within connection pools that are shared by all SQL links in the given instance. The pools are segregated by resource name and are accessed by resource name by the SQL links. For databases that only support ODBC connections, Sun Microsystems™ provides a JDBC-to-ODBC bridge driver that enables JDBC access to ODBC databases.

An SQL link must contain one or more SQL statements which can be a mix of inquiry and update statements. The SQL may be a select, insert, update, delete, or other valid SQL statement. The SQL statement to execute is specified in the intra-element text specified between the start and stop tags for the SQL element.

The present invention can also interface with a web service, thereby allowing the user of the present invention to interface the working environment with many different types of technology including Microsoft .NET, and Java2 Enterprise Edition (J2EE), for example. A web service is a software system designed to support interoperable machine-to-machine interaction over a network. It has an interface described in a machine-processable format (specifically WSDL, or web service description language, in one embodiment). Other systems interact with the web service in a manner prescribed by its description using SOAP-messages, typically conveyed using HTTP with an XML serialization in conjunction with other Web-related standards. WSDL is a machine-processable specification of the Web service's interface. It defines the message formats, data types, transport protocols, and transport serialization formats that should be used between the requester agent and the provider agent. It also specifies one or more network locations ("endpoints") at which a provider agent can be invoked, and may provide some information about the message exchange pattern that is expected. WSDL is the language used by a web service client and server so that the two sides can correctly interpret the XML data passed between them. The Web service link makes use of WSDL to dynamically bind and invoke methods contained by the web service. The link is able to pass arguments as well as return properties to the present invention. When the present invention connects to a web service, it interprets the WSDL and builds the objects necessary to communicate with the web server. Web services technology is a composition of several smaller technologies. The Web Service Definition Language (WSDL) defines its interface, data types, locations and other vital information used in binding. SOAP (Simple Object Access Protocol) is the messaging standard used to package data to be sent back and forth. All transmitted data is serialized into Extensible Markup Language (XML) which is used to exchange a variety of data. Abstract XML is transported via the Hypertext Transfer Protocol (HTTP).

The number of technologies needed to build web services increase the overall footprint of software required to activate them. The decision to utilize web services goes hand and hand with additional hardware requirements. Additional memory is required to load the necessary code and resources to invoke web services. Additionally, web services consume more network bandwidth than do protocols that are platform or vendor specific, such as Java RMI. Web services can be set up in the present invention configuration file using both a resource definition and a web-service link.

The Point-to-Point feature of the present invention allows the forwarding of RFID events or properties from the present invention instance to a remote JMS Point-to-Point Queue. In point-to-point messaging, two applications use Message Oriented Middleware to communicate with each other, often as an asynchronous replacement for RPC. Java Messaging Service (JMS) allows multiple senders, but only one receiver in this model. A queue, which channels the messages, forms the central concept of point-to-point messaging. An application interested in sending a message begins with a queue connection factory that obtains a queue connection. That queue connection then creates a queue session, the application's personal window into the connection. A JMS client uses that session to create a message producer, which sends messages to the queue1. On the other end, the receiving application goes through a similar sequence of obtaining a queue connection factory, a queue connection, and a queue session. The receiving application's functions differ from the sending application's in that it uses the session to create a message consumer to receive messages from the queue.

Configuring a Point-to-Point queue requires configuration on the present invention™ instance and in your particular J2EE application server. When multiple applications need to receive the same message(s), they use the publish and subscribe model. A many-to-many relationship exists between the message producers and the message consumers. Note that a topic forms the central concept in that model. Instead of message senders and receivers, you have message publishers and subscribers. A publisher uses a topic connection factory to create a topic connection. It then uses that topic connection to create a topic session, which provides the publisher with a personal window into the topic connection. The publisher can now use the topic session to create a message producer, which publishes messages to the topic. On the other end, the subscribing application goes through a similar sequence of obtaining a topic connection factory, a topic connection, and a topic session. The subscribing application differs from the publisher in that it uses the session to create a message consumer that subscribes to messages from the topic. Configuring a Publish-and-Subscribe topic requires configuration on the given instance and in the particular J2EE application server.

The external unstructured resource links feature of the present invention allows communication with external system resources using files or sockets lacking standard structure. The resources are used for input and/or output by the present invention. Examples of this type of resource are files on the local system or FTP server, TCP sockets or email messages. The present invention can include the external unstructured link resources mentioned above. Each of the unstructured resources share a common underlying structure which utilizes input and output streams to manage the information generated by the present invention actions. Once the present invention is configured with external resources, several links can be used to interact with them. The print and println links are used to write string data to the resource, for example. The println link performs the same operation as the print link and ends the written data with a new line separator.

In addition to writing data to resources, the print and println link will open resources if they are currently closed. The current RFID event will be used in expanding the properties of the resource properties (i.e. filename) if applicable. The close link will close any external output link resource if it is currently open. When resources are opened or closed, sequence data defined by the resource may be written. For example, if the present invention is writing out to a file resource, it could write a pre-defined header with the time in which it was opened or closed. Resources are opened automatically when the first print/println links for that resource are executed. The present invention also allows transfers between input and output external link resources. The transfer link will open an input stream and send all of its contents to an output stream. A simple example of this could be copying a file from location to location. The same file could also be sent as the body of an email, or streamed to an FTP server. When a destination resource is provided, the close link also provides transferring capability when an output resource is closed. The closing resource must also be an input resource so that it can be read. Using the close tag whenever is possible is recommended because it prevents resource contention in a multithreaded configuration. Configuration and use of external unstructured links occurs in two places in a configuration file; resource configuration and chain definition. To use the external links (print, println, close and transfer), external link resources must be first defined in the configuration.

The file resource creates a disk file and may reference any file available to the user running the present invention. The email resource produces an email and transmits that email to a specified user or list of users. The FTP resource transfers a file to a FTP server. FTP transfers require a username and password to authenticate the client system to the server.

The present invention further provides a user interface tool for the purpose of creating and executing user interfaces for the end users of an RFID-enabled system. In doing so, the present invention provides a robust system to monitor, manage, and interact with the RFID infrastructure and associated systems.

Figure 10:
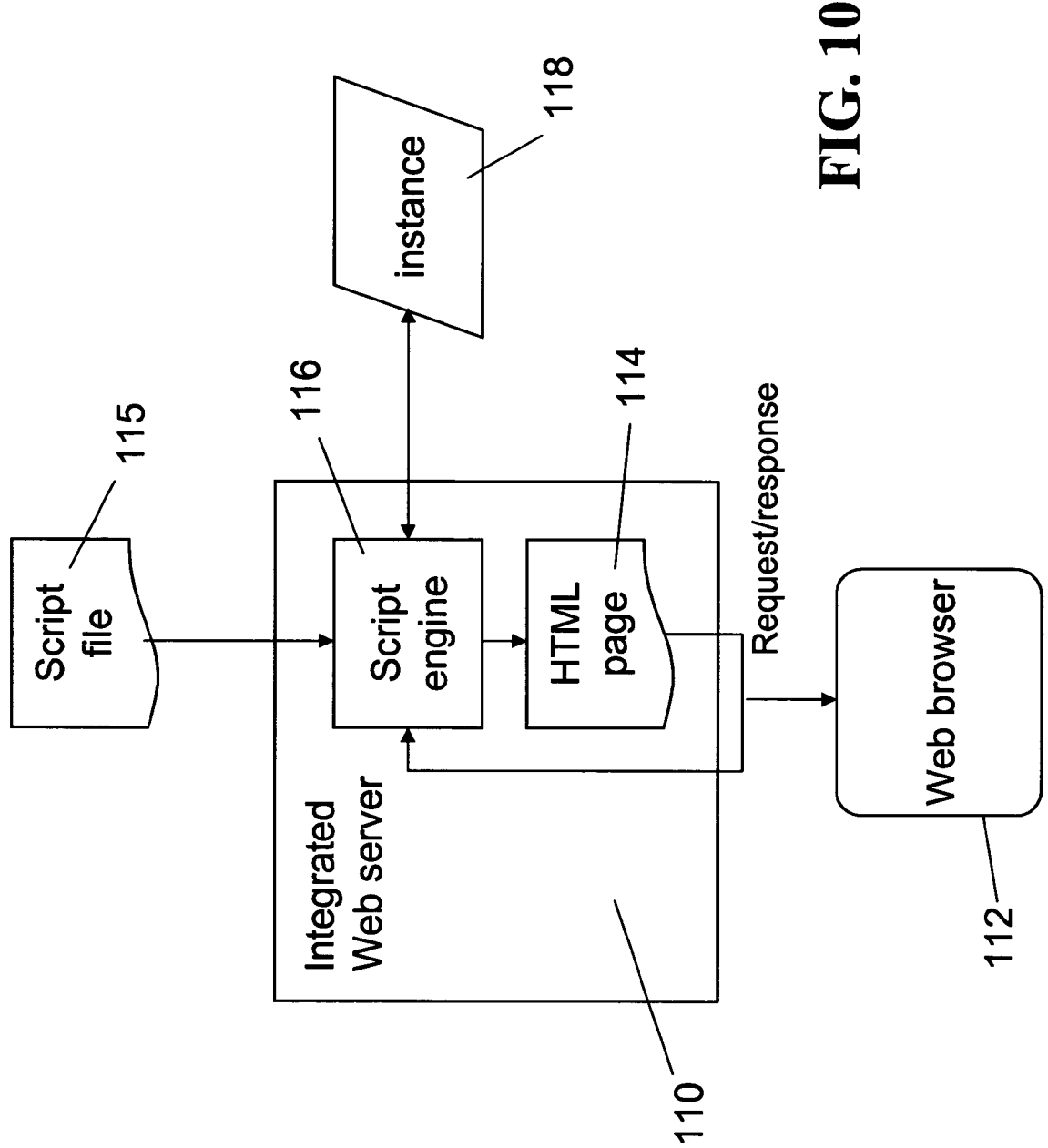
FIG. 10 is a diagram illustrating use of an integrated web server in providing user interfaces for use with the present invention.

For the purpose of user interface development and presentation, the present invention provides an integrated web server 110 (a.k.a. HTTP server) with an integrated scripting language, as shown in FIG. 10. Using this web server and scripting language a developer can easily construct robust interfaces, usable via a standard web browser 112, which interact closely with a running instance 118 of the present invention. The integrated web server provides server-side scripting capability along the lines of ASP, JSP, and PHP. This model of web page development mixes standard HTML text with inline program code that executes on the server with the results being sent to the web browser as an HTML page. In one embodiment, only requested files that end in the extension .psp will be compiled and executed, while all other files are transmitted verbatim to the web client.

The steps involved in developing the user interfaces in accordance with the present invention include defining a functional configuration for an RFID system as described elsewhere herein, activating an internal HTTP server, creating a script file having a combination of static text and program code, providing a graphical user interface capable of receiving a request for the script file, and providing a script engine for interpreting, compiling and executing the script file and sending script file output to a graphical user interface. In an illustrative embodiment, the output can be indicative of a user interface capable of receiving instructions for configuring hardware in the RFID system, sending RFID data to external computer programs (e.g., SCM), and/or introducing instructions and additional RFID data into the RFID system.

The flow of activity in this model is, first, the client web browser 112 makes a request to the server 110 to get a page 114. If the requested file has the file extension .psp, in one embodiment, then the nested actions are performed, whereby the script engine 116 retrieves the requested file 115 from disk or from an internal cache if the file has been viewed recently, the script engine builds a program using the HTML contents and script language contents, and the script engine executes the program, which can interact with the instance 118, and other systems using the scripting language. The output of the script execution is HTML text that is transmitted to the web browser. The web browser displays the newly generated HTML page.

The script being executed has access to the HTTP request and response values, session objects, and internal objects and attributes associated with instance 118. The integrated HTTP server can be defined using a <http> element in the <server> section of the present invention configuration file. If a <http> element is not defined then the present invention does not provide an HTTP server. When defining the HTTP server, a port to listen on and a document root directory may be specified.

In one embodiment, the scripting environment provided by the present invention is based on the Python programming language. In this instance the Python language syntax is implemented using the Java language. The resulting hybrid, called Jython, provides the comfortable syntax of Python with the capability to integrate closely with Java based environments. In another embodiment, the scripting environment is based on the use of Java server pages.

The HTTP server is configured via an http element within the server section of a configuration.

A sample user interface developed as described might show various reader status information, including the reader name, type, status (not ready, ready, e.g.) and whether it is in auto-mode or polled mode. Such an interface could also be provided to allow the user to turn automode on and off, for example. It will be appreciated that all of the various user interactions necessary to facilitate the different configuration, data manipulation and control and other functionalities of the present invention can be represented through the user interface.

Figure 11:
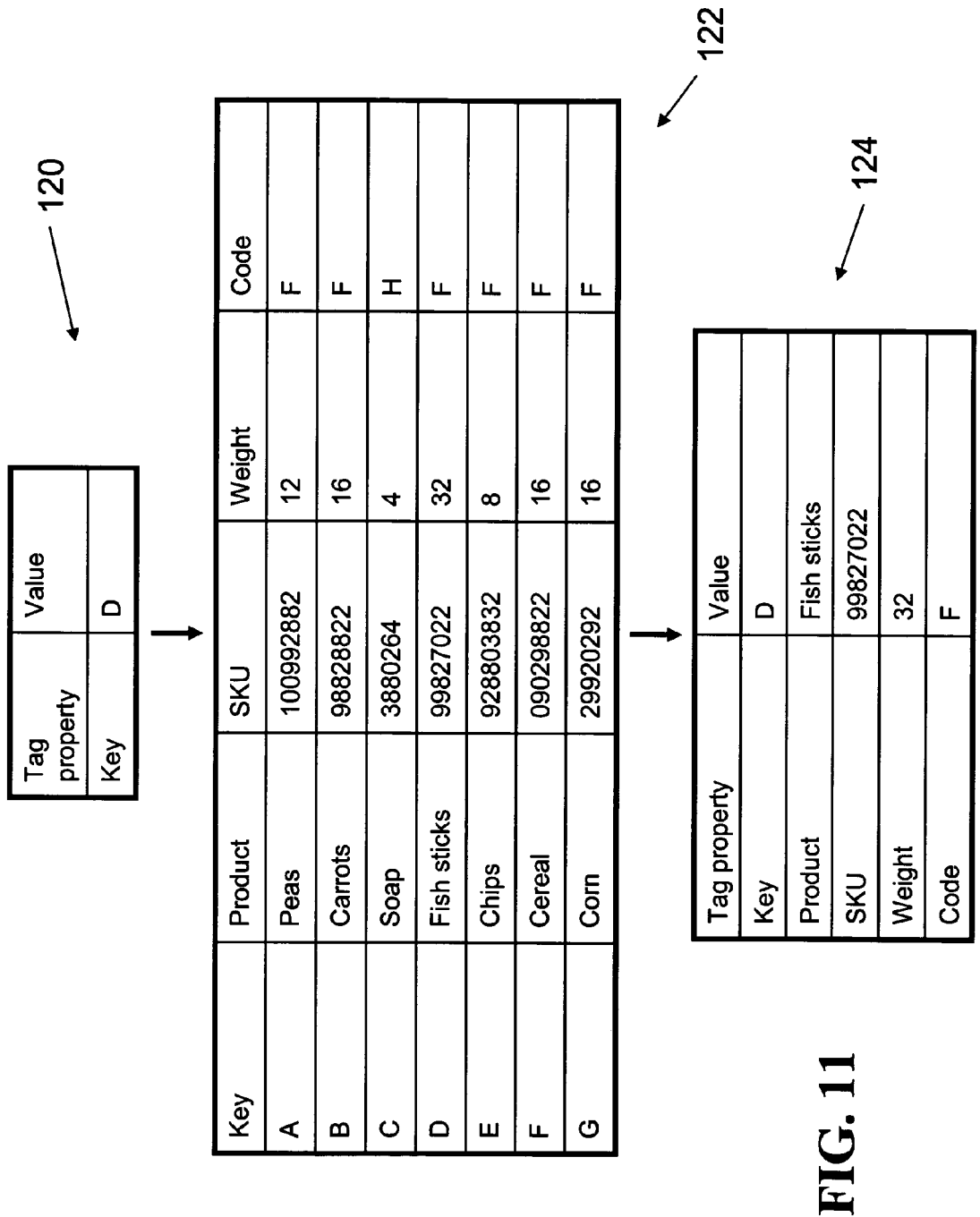
FIG. 11 is a flow diagram of an illustrative embodiment of the cross reference or table lookup element of the present invention.

The present invention can also employ cross-reference table functionality. A table of values can be loaded into memory, whereupon the data can be manipulated and saved back to the data source. Cross reference or lookup tables are accessed as resources in the present invention. A lookup table is a simple way to assign several ancillary data values to a tag or event during a processing chain. One can create lists of tag items with any additional properties necessary. Another use might be to remove the tagged items from a checklist. These examples are useful in shipping and receiving scenarios. The table in FIG. 11 illustrates the activity of a lookup table. A tag is passed through the table as at step 120, a property in the tag is matched against the key of the table shown at 122, and the properties associated with the key row in the table are added to the tag as shown at 124. Lookup tables can be loaded from and saved to web services, SQL database and fixed or variable length flat files.

When a lookup table is defined, columns are made available for read/write access. Depending on the type of table lookup, the columns may automatically be defined by the present invention when the table is loaded. The web service and SQL table lookups are examples of lookups that automatically define the available data columns. Alternatively, the file lookup (both fixed and variable) require the user to include column mappings in the configuration. The user may wish to take several data columns and simply map them to an event or tag as properties. To do this, the lookup table must define parameters. The parameter tells the present invention what data columns values to assign to specific property names of the event or tag. Parameters may be optionally defined for any type of lookup table.

The present invention can map column data to an event or tag, manipulate data in lookup tables, save changes to tables, reload table data, define a table resource and define an external source lookup table using conventional mechanisms.

The audit logging system of the present invention provides a means to track activity within a running instance. The data can then be viewed and used to reconcile the behavior of the present invention against an external system to which the data is fed.

Figure 12:
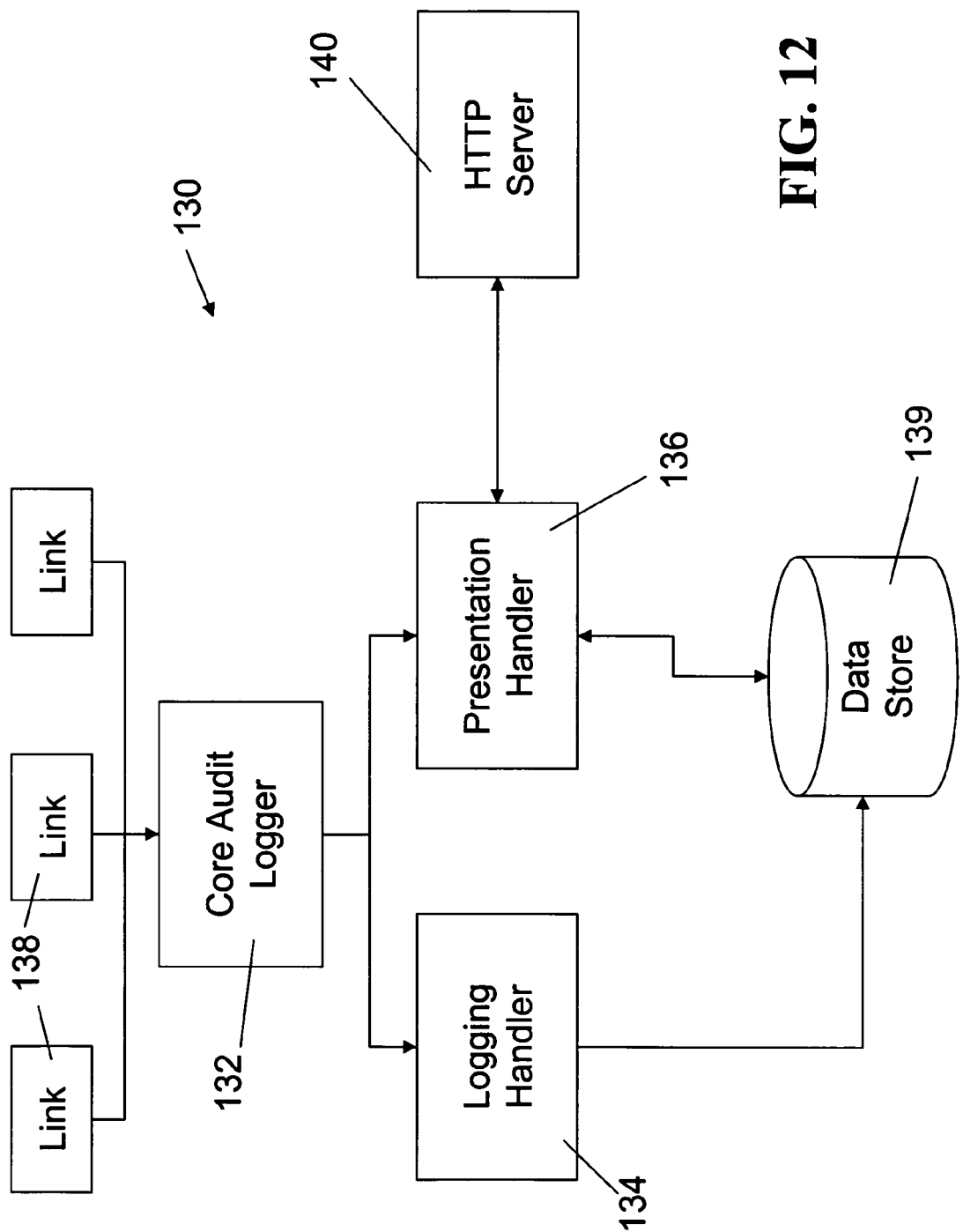
FIG. 12 is a schematic diagram of an audit logging component of the present invention.

As shown in FIG. 12, the audit logging component 130 of the present invention comprises four components: the core audit logging system 132, a logging handler 134, a presentation handler 136, and processing links 138. The core audit logging system 132 manages the event log requests from processing links 138 and dispatches them to the defined logging handler 134. It also maintains the state and operation of the logging and presentation handlers. The core audit logging system 132 can be defined in the resource section of a configuration of the present invention. The logging system is designed such that the default logging handler 134 and presentation handler 136 can be replaced with custom written handlers to suit specific application requirements. Any link in the system can be defined to log its activity to the audit logging system. The log and log-description attributes provided in the link definition indicate that the contents of the event should be logged. The event is sent to the logging handler after the event completes its processing. The log-detail link causes the system to log detailed information about the event, including a log record for each tag in the event. The log-detail link can also apply grouping logic to the tag data to provide a higher level of abstraction to the data logged. The logging handler receives event log requests from processing links. The handler then performs the logic to store the information in that event to a logging data store 139.

The present invention can be provided with a default logging handler that stores events and tags to a relational database. In one embodiment, the present invention bundles an embedded Java™ relational database called Derby™, from the Apache group at www.apache.org. The default logging handler can also be configured to use an external database, such as Oracle™, SQLServer™ or mySQL™, for example. The present invention also provides a default presentation handler 136 suited to the default logging handler. The default presentation handler 136 provides a web browser based interface to query the contents of the audit log, such as via HTTP server 140.

In one embodiment of the present invention, the default audit logger and presentation handler provide a simple means to produce an audit log of activity within the present invention. The system in on embodiment can be bundled with an embedded database, but external databases may also be configured with the audit logger. The default audit logging system presents the audit information via a web browser based interface.

In one embodiment, the default logging handler can be configured to use an external database, rather than the embedded Derby™ database in the example implementation above. To point the default logging handler to an external database, the driver and url properties are changed, and the username and password properties may need to be changed. In one embodiment, the default presentation handler can provide a web browser based interface into the audit log data. The port on which the web pages are served is settable via a configuration property, as will be understood to those of ordinary skill in the art. The audit logging system of the present invention is user extensible so users can add their own functionality or reporting to the audit logging system.

The present invention can further be used to manage tag non-volatile read-only memory (NVRAM). For example, if one needs to store a number that whose maximum value will never be greater than 128000, the standard alternative is to store it as a 32 bit integer, which can be very wasteful if you only have 2000 bits of space. With this aspect of the invention, one can map that to any 17 bits in the tags NVRAM and use the remaining 15 bits for some other data. The present invention provides a means to map NVRAM on a physical tag to properties within the system. Once mapped to a property, the NVRAM can be accessed and modified just like any other property associated with a tag.

The process of manipulating NVRAM within a tag consists of three actions: 1) mapping properties to the NVRAM space, 2) reading in the NVRAM from the physical tag, 3) writing modified NVRAM back to the physical tag. Reading the contents of NVRAM from a tag is accomplished via the tag-read link. This link will read all of the contents of NVRAM from the tag and store it in a buffer associated with the tag object in the present invention. In reading in the memory of the tag, one must specify a reader to read the tag. The configuration may specify forcing the re-reading of all the bytes within a specified range, or just those that it has not read before.

Mapping properties to the NVRAM defines a property name and associates that name with a range or ranges of bits within the NVRAM. Once a property is mapped, it may be read and updated by any other link within the present invention. When mapping a property, the mapping link must define the address range to map, the property name, the data type of the property and possibly the byte order of the data. The data type can either be an Integer or a String. The mapping allows the rest of the application to read and modify this memory as if reading and modifying local native variables, without regard for how the variables are actually stored in the chip. Once the application modifies the properties, it signals the system to write the memory back to the chip. The configuration may specify a write of only modified bytes of data, or all data.

Writing the contents from the present invention back to the physical tag is accomplished via the tagwrite link. The tag-write link will write back either all of the values onto the tag or just the space in memory that has changed. When initializing the NVRAM in a tag, it is recommended that all memory be written back to the tag. After initialization, writing back only the changes to tag NVRAM is more efficient.

In one embodiment of the invention, the memory contents can be written back to the tag using a reader which is different from the specified reader which reads the tag memory contents. This may occur, for example, in a warehouse environment where a first reader detects and reads a tag at a first location, whereby the NVRAM management of the present invention occurs, and a second reader writes the processed memory contents back to the tag upon detecting the tag at a location downstream of the first reader. In another embodiment of the invention, the NVRAM can be read from a first tag and written to a second tag. This may occur, for example, in a situation such as that where an individual has a passport provided with a tag, and the individual is seeking to renew the passport. The tag may have information such as encoded visa and biometric information, for example, and the reader, upon detecting the tag, may read the memory contents for manipulation and write the memory contents back into a new passport containing a new and/or different tag.

An example of the tag-map link configuration attributes are shown below. When executed, this link creates the mapping in each tag within the event.

TABLE 4

| Attribute | Attribute Type | Required? | Comment |
| --- | --- | --- | --- |
| Address | String | Yes | Specifies the address range within NVRAM to map to the property |
| Data | String | Yes | The name of the property to map to the address range in NVRAM |
| Type | String | Yes | The data types of the property. The valid data types are integer, string. |

TABLE 4-continued

| Attribute | Attribute Type | Required? | Comment |
|---|---|---|---|
| Big-endian | Boolean | No | Specifies whether the numeric value is stored with the most significant bytes (MSB) first or last. If this attribute is true, then the MSB is in the lowest byte space. If the attribute is false, the MSB is in the highest address space. The default value is "true". |

The address value is the byte and bit addresses within the NVRAM to map to the property. In one embodiment, the starting and ending addresses are separated by a colon. The beginning bit address is inclusive of the specified bit, the ending bit address is exclusive of that bit. Address values are in the format of byte-offset[.bit-offset]. Byte-offset is the byte number, starting with byte 0, from the beginning of the tags NVRAM. Bit-offset is the bit number within that byte. Bit 0 is the most significant bit in the byte. The bit-offset portion is optional, if omitted the bit offset defaults to zero (0). To express the address of the second bit of the 23$^{rd}$ byte one would write 22.2, remembering that the byte addresses begin at zero. Therefore the first byte has the address of zero, second byte has address 1, etc. To express the address range of the first byte though the sixth bit of the third byte one would use '0:2 6'. When a String property is mapped to a bit range, any bits beyond the last byte of the map are not used because each character of a String occupies 1 byte and any left over bits cannot hold a meaningful value. If the space mapped to a String is longer than a String value assigned to the property the value is right padded with spaces.

The following examples use the 2 bytes of memory in Table 5 as example memory space.

TABLE 5

| | Byte | | | | | | | | | | | | | | | |
|---|---|---|---|---|---|---|---|---|---|---|---|---|---|---|---|---|
| | Byte 0 | | | | | | | | Byte 1 | | | | | | | |
| Bit | 0 | 1 | 2 | 3 | 4 | 5 | 6 | 7 | 0 | 1 | 2 | 3 | 4 | 5 | 6 | 7 |
| Value | 1 | 0 | 1 | 0 | 0 | 1 | 1 | 1 | 0 | 1 | 0 | 1 | 0 | 1 | 0 | 0 |

As an example, the following tag-map link may be used with a tag with the memory shown above: <tag-map data="i1" address="0:1" type="Integer"/>. This command will map the bits from byte 0, bit 0 to byte 1 bit 0. The resulting value of property 'i1' will be 167 (10100111 binary). To map the entire space to the property 'i1' the map link would be: <tag-map data="i1" address="0:2" type="Integer"/>. The value of 'i1' resulting from that map would be 42836 (1010011101010100 binary).

As another example, the following tag-map link maps an oddly aligned integer value to a property: <tag-map data="i2" address="0.2:1.2" type="Integer"/>. This command maps the bits from byte 0, bit 2 to byte 1 bit 2. The resulting value of the property 'i2' will be 157 (10011101 binary). As a further example, the following mapping maps an odd sized value to an Integer: <tag-map data="i2" address="0.4:1" type="Integer"/>. This link maps the bits from byte 0, bit 4 to byte 1 bit 0 to the property named 'i2'. The resulting value of 'i2' will be 7 (111 binary).

As a string example, the following tag-map link maps a single character String to byte 1 of the tag's memory: <tag-map data="s1" address="1:2" type="String"/>. The resulting value of 's1' is 'T'.

Another related aspect of the present invention involves describing the NVRAM mappings in an XML file format such that one can define variant structures (e.g., variable Y in memory exists only if variable X=1), repeating structures (e.g., variable Z is repeated X number of times in the memory), and predefined structures (e.g., variable Q is a combination of a 4 bit integer, a 10 character alpha packed string, and a 9 bit integer). Using the XML format, one can do things like automatically detect the structure of the data stored in memory and upgrade the structure to a new version when the tag is detected.

Using an XML scheme like the one below, one can define complex types and structures for the entire NVRAM space. The scheme below allows the following actions:
1) Nested types, where one custom type is a combination of multiple other types (including custom times).
2) A union of types, where the application can look at the memory space in two different ways to get two very different sets of values.
3) Repeating objects where a chip may contain 0 to N values of a type, N depends upon some other value stored on chip.
4) Represent some set of values where the members of that set are fairly large values (like names or long addresses), but the value stored on chip is some enumeration value of it.
5) Have conditional values where a type may not appear on chip based on the value of some other property.

The system has a set of base (or standard) types such as Integer, String, Date, Time, packed-String, etc. These base types are the basic building blocks of all the other data types. The NVRAM-map object is a rule that states 'If the internal condition is met, then map this data type to the NVRAM of the tag.' Each object name equates to a property name within the tags property space. The application that wants to use these maps would attempt to map a set of definitions to a chip. If the map succeeds, then all of the properties defined for the mapped type are available to the application.

```
<type name="TypeName" >
    <object name="name" type="TypeName|base-type" size="number" >
        <if ...>
    </object>
    <object name="name" type=" TypeName|base-type" size=
    "number" >
        <if ...>
    </object>
</type>
<type name="TypeName" >
    <union >
        <object name="name" Type=" TypeName|base-type" size=
        "number" >
            <if ...>
        </object>
        <object name="name" Type=" TypeName|base-type" size=
        "number" >
            <if ...>
        </object>
    </union>
</type>
<type name="TypeName >
    <repeat min="number" max="number">
        <object name="name" Type=" TypeName|base-type" size=
        "number" >
    </repeat>
</type>
<type name="TypeName" >
    <set>
        <enumeration value="number">Mapped Value 1</enumeration>
        <enumeration value="number">Mapped Value 2</enumeration>
    </set>
</type>
<nvram-map name="name" type="TypeName">
    <if arg1="value" op="op" arg2="value"/>
    <or>
    <if arg1="value" op="op" arg2="value"/>
    <and>
    <not>
    <if arg1="value" op="op" arg2="value"/>
</nvram-map>
```

In one embodiment, the present invention can span multiple computers, allowing multiple instances of the software embodiment of the present invention to communicate RFID events between them. The present invention™ provides two (2) mechanisms for communicating between distributed instances, RMI and XML. The RMI mechanism uses the standard Java™ remote method invocation (RMI) protocol. The XML mechanism uses a custom defined protocol that transforms events into XML structures for transmission across a network. The paradigm is that as a link processes an event, the link may send the event to another instance of the present invention, possibly on another computer. The remote instance of the present invention performs some additional processing on the event and then returns the possibly modified event back to the local instance. This type of distributed processing allows the developer to concentrate complex logic in one location that may be shared across multiple other instances of the system.

The RMI transport feature of the present invention allows the forwarding of RFID events between remote instances over a network. Java™ Remote Method Invocation (Java RMI) enables the programmer to create distributed Java based to Java based applications, in which the methods of remote Java objects can be invoked from other Java virtual machines, possibly on different hosts. RMI uses object serialization to marshal and unmarshal parameters and does not truncate types, supporting true object-oriented polymorphism. In the configuration of the present invention, the option is provided to allow the server to communicate with remote servers. Client machines must specifically point to the remote machines by creating a resource. While the event is being processed by the remote server, it may alter the data it contains. The altered event is returned to the client machine and continues down the local chain. Because connecting instances over a network introduces more possibility of failures in the link due to network failures, it is recommended that forward links that use the RMI transport should also implement error handling with the onerror attribute, for example. RMI requires an RMI registry for proper operation. If another system has started the RMI registry on tcp port 1099, the present invention will use that registry. If there is no RMI registry available, the present invention will start one on the local system. If there are firewalls located on the network between the local and remote instances, port 1099 should be opened to allow RMI traffic to transit the network.

The XML transport feature of the present invention allows the forwarding of RFID events from one instance or disparate system to a remote instance over a network. Unlike the RMI Transport, the XML Transport uses an easily implemented protocol to transfer RFID events. This enables the programmer to create distributed applications using any network enabled programming language. The XML transport attempts to use basic serialization to marshal and unmarshal parameters. Because the XML Transport is platform independent, it is not as capable at serializing unknown types. In the present invention, the option is provided to allow the server to communicate with remote servers. Client machines must specifically point to the remote machines by creating a resource. While the event is being processed by the remote server, it may alter the data it contains. The altered event is returned to the client machine and continues down the local chain. Because connecting instances over a network introduces more possibility of failures in the link due to network failures, it is recommended that forward links that use the XML transport should also implement error handling with the onerror attribute.

The RFID reader simulator provided in connection with the present invention provides a means to produce a predictable and consistent set of RFID tag data to validate system configurations and interfaces. The simulated reader is divided into two components, a standalone reader simulator that runs a separate Java program, and a reader object within a program of the present invention. The stand-alone reader simulator acts as a network TCP socket server that waits for an instance to connect to it. Once connected, the simulator will feed a series of tag events to the program based upon the configuration file of the simulator. The simulator can support multiple instances connecting to the same simulator and receiving the same scenario of events. The event scenario data sent to an instance is determined by the network port to which the present invention connects to the simulator. The simulator can be configured to continuously repeat a scenario to the instance, or to play the scenario only once. The simulator can also produce ISO, EPC-64, or EPC-96 tags to the instance. In one embodiment, the simulated reader has two antennae and the scenario can use either antenna. The reader simulator can reside anywhere one the network that is reachable by the instance that wishes to communicate with it. This allows multiple developers to utilize the same simulation resources and scenarios without having to distribute scenario files to all developers.

Scenario definitions can comprise a port and repeat values for the scenario, and a list of tag events for the scenario. Tag event definitions consist of a tag id for the event, the antenna seeing the event, the type of tag for the event, the time the tag becomes visible, and the time the tag disappears. The appear and disappear (or in and out) times are relative, in milliseconds, to the time that the instance connects to the simulated reader.

Scenarios may be generated by hand using a text editor to create the simulated reader configuration file. Scenarios may also be created my using the sim-recorder link. The sim-recorder link records the stream of tags that the link encounters into a file that can be replayed by the simulated reader. This allows a developer or tester to replay a real-world scenario within a test environment to validate the behavior of a configuration or application.

The present invention further supports the definition and use of custom number formats, including methods of defining how to parse and how to build large complex numbers that are comprised of small numbers. An example of a number system is the format defined by EPCGlobal to embed company id, product id, and serial number within a 64 bit or 96 bit number.

Number systems in connection with the present invention provide a robust and flexible way to encode multiple numeric values into a single large number and then to retrieve those embedded values. Number systems are comprised of four components: a Definition File, a Resource within a configuration, a Parse Link, and a Build Link. The definition file, in one embodiment, is an XML file that includes the rules that dictate the format of one or more number systems. The resource within a configuration reads the XML definition and keeps it in memory for future use by a parse or build link. The parse link takes a large number and, using the number system rules, decomposes the number into its component smaller number. The build link takes a series of properties and, using the number system rules, builds the larger enveloping number.

A example of a number system is the EPC's SGTIN number. In this number system the upper two bits of the 64-bit tag number determine the type of number which dictates the content of the remaining sixty-two bits. The example in Table 6 is the format definition for a SGTIN-96 bit number.

TABLE 6

| Header Size | Filter Value Size | Partition | | Company Prefix Size | Item Reference Size | Serial Number Size |
|---|---|---|---|---|---|---|
| | | Size | Value | | | |
| 8 Value = 00110000 | 3 | 3 | 0 | 40 | 4 | 38 |
| | | | 1 | 37 | 7 | |
| | | | 2 | 34 | 10 | |
| | | | 3 | 30 | 14 | |
| | | | 4 | 27 | 17 | |
| | | | 5 | 24 | 20 | |
| | | | 6 | 20 | 24 | |

For the SGTIN-96 number format, the size of the Company Prefix value can range from 20 bits to 40 bits. The size of the Company Prefix and the Item Reference are determined by the value of the Partition.

The number system definition file can be an XML formatted file that specifies the potential formats of the numbers. A single XML file can define multiple number systems. The definition can include a constraint that specifies the minimum and maximum length of a number that can be parsed into the system, and its sub-components. For each sub-component, the definition names a tag or event property into which the sub-component value will be saved when the number is parsed, or used as the sub-component value when a number is built. The first step in parsing a number based on a number system consists of passing in the number to split it into its components. The present invention will then parse the number based on the number system and record the sub-component values into tag, event or system properties. Those properties added to the tag or events are available for subsequent links in the processing chains.

The first step in building a number based on a number system consists of passing in a tag that contains the component values of a number then building that large number based on the properties values of the tag or event being processed. Number systems can be defined in the resource section of a configuration file and are referenced by the build and parse links. Number systems can be defined in an XML file, for example.

The following example code illustrates a simple number system.

EXAMPLE 1

Example Simple Number System

```
1  <?xml version="1.0" encoding="UTF-8"?>
2  <number-systems xmlns:xsi=
   "http://www.w3.org/2001/XMLSchema-
   instance"xsi:noNamespaceSchemaLocation="numberSystem.xsd">
3  <number-system name="simple">
4  <constraint min-size="8" max-size="96"/>
5  <definition>
6  <slice data="partition" start-bit="63" length="4"/>
7  <switch value="${partition}">
8  <case value="1">
9  <slice data="number2" start-bit="15" length="8"/>
10 </case>
11 <case value="2">
12 <slice data="number2" start-bit="23" length="8"/>
13 </case>
14 <default>
15 <error>Error in the partition value partition=${partition}</error>
16 </default>
17 </switch>
18 <slice data="number" start-bit="7" length="8"/>
19 <set data="numberType" value="simpleType" />
20 <if arg0="${number2}" op="gt" arg1="500">
21 <set data="numberSize" value="large"/>
22 </if>
23 </definition>
24 </number-system>
25 </number-systems>
```

Line 1 is the standard XML header. Line 2 defines the file as number system definition file that conforms to the standard number system definition. Line 3 starts the definition of the number system named 'simple'. Line 4 specifies that the numbers parsed by the number system must be between 8 and 96 bits in length. If the number passed into the parse function does not conform to this constraint, the parse link will fail and perform it's specified error processing. Line 5 wraps the declaration of the components of the number system. Line 6 specifies that the bits starting at bit 63 and proceeding toward the least significant bit for 4 bits will be assigned to the property named 'partition' when the number is parsed. The bits in a number start at bit zero, which is the least significant bit. For a 64 bit number, bit 63 is the most significant bit in the number. The slice element of a number system definition is the specifies a slice of bits within the larger number that contain a property when parsed or are derived from a property when a number is built. The offset of a slice does not have to be byte or nibble aligned (i.e. starting on a byte or nibble boundary). This simple example is using byte aligned values to simplify the explanation.

Lines 7 through 17 specify a switch statement. Like a switch statement in a programming language, each case element under the switch element declares a possible sub-definition of the number. In this example, if the value of the partition property is equal to 1 then the definitions in the first case element, lines 8 through 10, will be applied to the number operation. If the value of partition is neither 1 nor 2 then definitions in the default element of the switch will be applied to the number operation. The definitions beneath a case statement may include any combination of slice, set, switch, if, and error elements. In this example, if the switch operation applies the rules in the default case then the error element on line 15 is applied. The error element causes the number operation (build or parse) to produce an error message to the log and that link will immediately execute its specified error handling operation. The parsing stops at that point in the process, any properties set remain set.

Line 18 specifies another bit slice within the larger number. In this case, the number starts at bit 7 and is 8 bits long, effectively representing the least significant byte of the number. Line 19 utilizes the set element. This element sets a property in the tag or event to a specific value. The set element is only processed during a parse operation. It has no meaning in a build operation. Lines 20 through 22 specify a if conditional in the operation. If the conditional specified in the element are true, then the subordinate operations are applied to the number operation. The definitions beneath an if statement may include any combination of slice, set, switch, if, and error elements. Lines 23 through 25 close out the number system definitions.

Once defined, a number system may be used within any chain in the system. The parse link uses the number system to split a value into it's component numbers. The build link uses tag or event property values to build a number. The parse link takes a number and splits it into its subordinate components based on a ruleset. The following example shows a number parse:

```
1 <parse number-system="simple">${tagID}</parse>
2 <echo>Post Parse: partition=${partition} number=${number}
  n2=${number2}number3=${number3}</echo>
```

The parse link in line 1 will use the rules defined in the 'simple' number system. The parse will parse the value of the property named 'tagId'. If the value of tagId is '0x1000111213141516', then the resulting echo message in line 2 will be Post Parse: partition=1 number=22 n2=21. The bit composition of the tagId is shown in Table 7.

Building a number operates in the opposite manner of parsing a number. Given the property values in Table 9, the following build link will produce the results in the sequent number: <build number-system="simple" data="value"/> 0x1000000000223F or 450359962739263 decimal.

TABLE 9

| Property | Value (decimal) | Value (hex) |
|---|---|---|
| Partition | 1 | 0x1 |
| Number | 63 | 0x3F |
| Number2 | 34 | 0x22 |

Management of the system of the present invention can occur through interface 50 shown in FIG. 1, which can be implemented in one embodiment using Java Management Extensions (JMX). Java Management Extensions (JMX) has emerged as a standard for Java technology based applications to be dynamically configured, managed and monitored. JMX provides a window into an application's state and behavior as well as protocol independent methods to alter these attributes and operations. The JMX specification defines a three-layer model architecture consisting of an instrumentation layer, agent layer, and manager layer. The instrumentation layer allows any Java object to be manageable as long as the object has implemented the necessary interfaces as defined by the JMX specification. The object exposed is referred to as a managed bean (MBean). An MBean exposes attributes and operations which can be used to manipulate the underlying resource by the management application.

The agent layer is targeted towards the management application community by providing specifications for developing management agents. The agent layer is at the center of the JMX framework providing remote management applications access to all of the registered MBeans. The agent is responsible for manipulating the MBeans defined in the instrumentation layer and exposing them to external applications. A JMX agent includes an MBean Server which is responsible for managing and providing directory services to a group of registered MBeans. The agent may also contain management services such as dynamic class loading, monitors, timers and relation services. Example MBean views are shown in interfaces 85 and 86 of FIGS. 5 and 6, respectively. An example server view is shown in interface 87 of FIG. 7.

TABLE 7

| | Bits | | | | | | | |
|---|---|---|---|---|---|---|---|---|
| | 63-60 | 59-48 | 47-40 | 39-32 | 31-24 | 23-16 | 15-8 | 7-0 |
| Value | 0x1 | 0x000 | 0x11 | 0x12 | 0x13 | 0x14 | 0x15 | 0x16 |
| Property | Partition | | | | | | Number 2 | Number 1 |

If the value of tagId is '0x2000111213141516', then the resulting echo message in line 2 will be Post Parse: partition=2 number=22 n2=20. The bit composition of the tagId is shown in Table 8.

TABLE 8

| | Bits | | | | | | | |
|---|---|---|---|---|---|---|---|---|
| | 63-60 | 59-48 | 47-40 | 39-32 | 31-24 | 23-16 | 15-8 | 7-0 |
| Value | 0x2 | 0x000 | 0x11 | 0x12 | 0x13 | 0x14 | 0x15 | 0x16 |
| Property | Partition | | | | | Number 2 | | Number 1 |

The distributed services or manager layer exposes MBeans and agents to external applications through a set of protocol adapters and connectors. This level allows agents and MBeans to be accessed regardless of their physical location and communication protocol. Protocol adapters provide access to MBeans using various protocols such as HTTP and SNMP. Connectors enable agents and management applications to communicate utilizing a variety of protocols including RMI and CORBA. The present invention has all three of these layers implemented within the base product including the RMI and HTTP management layer implementations.

As previously mentioned, JMX allows the use of a variety of protocols and adapters to access agents and remote MBeans. The Management Web Interface of the present invention utilizes the MX4J HTTP adaptor to communicate with the MBeans. This interface allows the server to be easily and dynamically configured, managed and monitored.

The present invention provides three means by which it may be extended by the user: custom links, startup classes, or embedding the present invention within other Java™ programs. Custom links enable Java objects to be called as if they are a link in the processing chain. At system startup, the custom defined class is loaded and the initialize method of the object is called with the configuration parameters. When an event is passed to the custom link, the link's eventOccur method is called and the event is passed to that method. The custom link object may perform any operation it desires on the event. The custom object is only called once per event, no matter the number of tags in the event. When it returns control to the chain the event is forwarded down the chain.

Startup classes allow the system extending user to load a Java object when the system is initializing and then have a method of that object called when the system is fully loaded and ready to operate. Startup classes are declared in the XML configuration file. This functionality can be used to add code to monitor custom machinery or network equipment.

The present invention can also be embedded within an existing Java™ program. The typical approach taken when embedding is to use the present invention to load a configuration file, then reference chains and resources from within the existing Java™ program.

Embodiments of a computer program product may be implemented by use of any recording medium for machine-readable information, including magnetic media, optical media, or other suitable media. Persons skilled in the art will immediately recognize that any computer system having suitable programming means will be capable of executing the steps of the method of the invention as embodied in a program product. Persons skilled in the art will recognize immediately that, although most of the exemplary embodiments described in this specification are oriented to software installed and executing on computer hardware, nevertheless, alternative embodiments implemented as firmware or as hardware are well within the scope of the present invention.

It will be apparent to one skilled in the art that any computer system that includes suitable programming means for operating in accordance with the disclosed methods also falls well within the scope of the present invention. Suitable programming means include any means for directing a computer system to execute the steps of the system and method of the invention, including for example, systems comprised of processing units and arithmetic-logic circuits coupled to computer memory, which systems have the capability of storing in computer memory, which computer memory includes electronic circuits configured to store data and program instructions, programmed steps of the method of the invention for execution by a processing unit. The invention also may be embodied in a computer program product, such as a diskette or other recording medium, for use with any suitable data processing system. The present invention can further run on a variety of platforms, including Microsoft Windows™, Linux™, Sun Solaris™, HP/UX™, IBM AIX™ and Java compliant platforms, for example.

What is claimed and desired to be secured by Letters Patent is:

1. A tag identification information system, comprising:
   a reader interface component for receiving data from at least one tag reader, said reader being either polled for tag information or set to automatically detect tag information from an item bearing at least one tag;
   a field control element for defining tag query fields associated with said at least one tag reader;
   a process sequence control element for associating said tag reader and said detected tag information into an event, said event representative of a time or location wherein said at least one tag is detected by said at least one reader, wherein the process sequence control element is provided in a pipe-and-filter architecture;
   an enterprise interface component for receiving event information; and
   a management and monitoring component for managing and monitoring said at least one tag reader and said at least one tag, said management component providing an interface for said field control element and for establishing said process sequence control element.

2. The system of claim 1 further including a reader registrar containing reader interface details.

3. The system of claim 1 further including a ruleset registrar containing rules for evaluating and routing events to at least one chain.

4. The system of claim 1 wherein said process sequence control element includes at least one link and at least one chain comprised of one or more links.

5. A method for detecting and managing tag identifications, comprising the steps of:
   providing a reader interface component for receiving data from at least one tag reader, said reader being either polled for tag information or set to automatically detect tag information from an item bearing at least one tag;
   providing a field control element for defining tag query fields associated with said at least one tag reader;
   providing a process sequence control element for associating said tag reader and said detected tag information into an event, said event representative of a time or location wherein said at least one tag is detected by said at least one reader, wherein the process sequence control element is provided in a pipe-and-filter architecture;
   providing an enterprise interface component for receiving event information; and
   providing a management and monitoring component for managing and monitoring said at least one tag reader and said at least one tag, said management component providing an interface for said field control element and for establishing said process sequence control element.

6. The method of claim 5 including the step of providing a reader registrar containing reader interface details.

7. The method of claim 5 including the step of providing a ruleset registrar having rules for evaluating and routing events to at least one chain.

8. The method of claim 5 wherein said process sequence control element includes at least one link and at least one chain comprised of one or more links.

9. A tag identification information system, comprising:
- a reader interface component for receiving data from at least one tag reader, said reader being either polled for tag information or set to automatically detect tag information from an item bearing at least one tag;
- a field control element for defining tag query fields associated with said at least one tag reader;
- a process sequence control element for associating said tag reader and said detected tag information into an event, said event representative of a time or location wherein said at least one tag is detected by said at least one reader;
- a chain registrar containing information for processing said event;
- an enterprise interface component for receiving event information; and
- a management and monitoring component for managing and monitoring said at least one tag reader and said at least one tag, said management component providing an interface for said field control element and for establishing said process sequence control element.

10. A tag identification information system, comprising:
- a reader interface component for receiving data from at least one tag reader, said reader being either polled for tag information or set to automatically detect tag information from an item bearing at least one tag;
- a memory mapping component for mapping memory of said at least one tag;
- a field control element for defining tag query fields associated with said at least one tag reader;
- a process sequence control element for associating said tag reader and said detected tag information into an event, said event representative of a time or location wherein said at least one tag is detected by said at least one reader;
- an enterprise interface component for receiving event information; and
- a management and monitoring component for managing and monitoring said at least one tag reader and said at least one tag, said management component providing an interface for said field control element and for establishing said process sequence control element.

11. A tag identification information system, comprising:
- a reader interface component for receiving data from at least one tag reader, said reader being either polled for tag information or set to automatically detect tag information from an item bearing at least one tag;
- a field control element for defining tag query fields associated with said at least one tag reader, wherein the field control element includes means for defining multiple antennae within a single field;
- a process sequence control element for associating said tag reader and said detected tag information into an event, said event representative of a time or location wherein said at least one tag is detected by said at least one reader;
- an enterprise interface component for receiving event information; and
- a management and monitoring component for managing and monitoring said at least one tag reader and said at least one tag, said management component providing an interface for said field control element and for establishing said process sequence control element.

12. A tag identification information system, comprising:
- a reader interface component for receiving data from at least one tag reader, said reader being either polled for tag information or set to automatically detect tag information from an item bearing at least one tag;
- a field control element for defining tag query fields associated with said at least one tag reader;
- a tag direction determination component;
- a process sequence control element for associating said tag reader and said detected tag information into an event, said event representative of a time or location wherein said at least one tag is detected by said at least one reader;
- an enterprise interface component for receiving event information; and
- a management and monitoring component for managing and monitoring said at least one tag reader and said at least one tag, said management component providing an interface for said field control element and for establishing said process sequence control element.

13. A tag identification information system, comprising:
- a reader interface component for receiving data from at least one tag reader, said reader being either polled for tag information or set to automatically detect tag information from an item bearing at least one tag;
- a field control element for defining tag query fields associated with said at least one tag reader;
- a programming component for programming said at least one tag;
- a process sequence control element for associating said tag reader and said detected tag information into an event, said event representative of a time or location wherein said at least one tag is detected by said at least one reader;
- an enterprise interface component for receiving event information; and
- a management and monitoring component for managing and monitoring said at least one tag reader and said at least one tag, said management component providing an interface for said field control element and for establishing said process sequence control element.

14. A method for detecting and managing tag identifications, comprising the steps of:
- providing a reader interface component for receiving data from at least one tag reader, said reader being either polled for tag information or set to automatically detect tag information from an item bearing at least one tag;
- providing a field control element for defining tag query fields associated with said at least one tag reader;
- providing a process sequence control element for associating said tag reader and said detected tag information into an event, said event representative of a time or location wherein said at least one tag is detected by said at least one reader;
- providing a chain registrar with information for processing said event;
- providing an enterprise interface component for receiving event information; and
- providing a management and monitoring component for managing and monitoring said at least one tag reader and said at least one tag, said management component providing an interface for said field control element and for establishing said process sequence control element.

15. A method for detecting and managing tag identifications, comprising the steps of:
- providing a reader interface component for receiving data from at least one tag reader, said reader being either polled for tag information or set to automatically detect tag information from an item bearing at least one tag;

providing a memory mapping component for mapping memory of said at least one tag;

providing a field control element for defining tag query fields associated with said at least one tag reader;

providing a process sequence control element for associating said tag reader and said detected tag information into an event, said event representative of a time or location wherein said at least one tag is detected by said at least one reader;

providing an enterprise interface component for receiving event information; and providing a management and monitoring component for managing and monitoring said at least one tag reader and said at least one tag, said management component providing an interface for said field control element and for establishing said process sequence control element.

16. A method for detecting and managing tag identifications, comprising the steps of:

providing a reader interface component for receiving data from at least one tag reader, said reader being either polled for tag information or set to automatically detect tag information from an item bearing at least one tag;

providing a field control element for defining tag query fields associated with said at least one tag reader, wherein the field control element includes means for defining multiple antennae within a single field;

providing a process sequence control element for associating said tag reader and said detected tag information into an event, said event representative of a time or location wherein said at least one tag is detected by said at least one reader;

providing an enterprise interface component for receiving event information; and providing a management and monitoring component for managing and monitoring said at least one tag reader and said at least one tag, said management component providing an interface for said field control element and for establishing said process sequence control element.

17. A method for detecting and managing tag identifications, comprising the steps of:

providing a reader interface component for receiving data from at least one tag reader, said reader being either polled for tag information or set to automatically detect tag information from an item bearing at least one tag;

providing a field control element for defining tag query fields associated with said at least one tag reader;

providing a tag direction determination component;

providing a process sequence control element for associating said tag reader and said detected tag information into an event, said event representative of a time or location wherein said at least one tag is detected by said at least one reader;

providing an enterprise interface component for receiving event information; and providing a management and monitoring component for managing and monitoring said at least one tag reader and said at least one tag, said management component providing an interface for said field control element and for establishing said process sequence control element.

18. A method for detecting and managing tag identifications, comprising the steps of:

providing a reader interface component for receiving data from at least one tag reader, said reader being either polled for tag information or set to automatically detect tag information from an item bearing at least one tag;

providing a field control element for defining tag query fields associated with said at least one tag reader;

providing a programming component for programming said at least one tag;

providing a process sequence control element for associating said tag reader and said detected tag information into an event, said event representative of a time or location wherein said at least one tag is detected by said at least one reader;

providing an enterprise interface component for receiving event information; and providing a management and monitoring component for managing and monitoring said at least one tag reader and said at least one tag, said management component providing an interface for said field control element and for establishing said process sequence control element.

* * * * *